United States Patent
Igasaki et al.

(10) Patent No.: US 6,573,953 B1
(45) Date of Patent: Jun. 3, 2003

(54) SPATIAL LIGHT MODULATION DEVICE WITH A REFLECTION TYPE SPATIAL LIGHT MODULATOR AND METHOD

(75) Inventors: Yasunori Igasaki, Hamamatsu (JP); Narihiro Yoshida, Hamamatsu (JP); Haruyoshi Toyoda, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 09/857,159

(22) PCT Filed: Dec. 3, 1999

(86) PCT No.: PCT/JP99/06801

§ 371 (c)(1),
(2), (4) Date: May 31, 2001

(87) PCT Pub. No.: WO00/34823

PCT Pub. Date: Jun. 15, 2000

(30) Foreign Application Priority Data

Dec. 4, 1998 (JP) ............................................. 10-345826

(51) Int. Cl.$^7$ ........................ G02F 1/135; G02F 1/1335; G02F 1/133; G02F 1/1337

(52) U.S. Cl. ........................ 349/25; 349/113; 349/114; 349/116; 349/130

(58) Field of Search ........................ 349/25, 113, 114, 349/123, 130, 116; 359/251, 253, 259, 238, 9; 382/211, 298

(56) References Cited

U.S. PATENT DOCUMENTS

| | | | |
|---|---|---|---|
| 4,466,702 A | 8/1984 | Wiener-Avnear et al. ... | 350/347 |
| 5,130,830 A | * 7/1992 | Fukushima et al. ......... | 349/123 |
| 5,467,216 A | * 11/1995 | Shigeta et al. .............. | 349/114 |
| 5,555,115 A | * 9/1996 | Mitsuoka et al. ........... | 349/116 |
| 5,841,489 A | 11/1998 | Yoshida et al. ............... | 349/17 |
| 6,348,990 B1 | * 2/2002 | Igasaki et al. ................ | 349/17 |
| 6,424,388 B1 | * 7/2002 | Colgan et al. .............. | 156/449 |

FOREIGN PATENT DOCUMENTS

| | | |
|---|---|---|
| EP | 0 023 796 A2 | 2/1981 |
| JP | A 56-43681 | 4/1981 |
| JP | A 4-178616 | 6/1992 |

OTHER PUBLICATIONS

J. Gluckstad et al., "Lossless Light Projection", Optics Letters, vol. 22, No. 18, 1997.

Li et al., "Optically addressed phase–only spatial light modulator using parallel–aligned nematic liquid crystal", Technical Report of IEICE, LQE97–83, 1997–10.

* cited by examiner

*Primary Examiner*—Tarifur R. Chowdhury
(74) *Attorney, Agent, or Firm*—Oliff & Berridge, PLC.

(57) ABSTRACT

In a spatial light modulation device using a reflection type spatial light modulator, read light is a P-polarized light that falls incident on the light reflection layer 17 at a slant. Liquid crystal in the light modulation layer 17 is oriented so as to incline, in association with the application of voltage by the driving circuit 2, within a plane that is parallel to a normal plane which includes the optical axes of both of the incident, read light and the output, modulated light.

14 Claims, 15 Drawing Sheets

LONG AXIS OF LIQUID CRYSTAL MOLECULES

POLARIZATION DIRECTION S

LONG AXIS OF LIQUID CRYSTAL MOLECULES

SPATIAL LIGHT MODULATION DEVICE WITH A REFLECTION TYPE SPATIAL LIGHT MODULATOR AND METHOD

TECHNICAL FIELD

The present invention relates to a spatial light modulation method and a spatial light modulation device that uses a spatial light modulator with liquid crystal as the light modulation material, and particularly to a spatial light modulation method and, a spatial light modulation device that uses a reflection type spatial light modulator.

BACKGROUND ART

There are two types of spatial light modulators: intensity modulation types and phase modulation types. Many spatial light modulators are the intensity modulation type, which are used in liquid crystal televisions, projector light bulbs, and the like. On the other hand, the phase modulation types show promise in fields such as light information processing and hologram processing. This is because the phase modulation types differ from intensity modulation types in that they have high light usage efficiency. A system that uses a phase modulating type spatial light modulator is disclosed by J. Gluckstad et al. in "Lossless Light Projection", OPTICS LETTERS, Vol. 22, No. 18, 1997.

Phase modulation type spatial light modulators include reflection types and transmission types. Reflection type spatial light modulators differ from transmission types in that the same surface serves as the light input surface for the read light and the light output surface for the modulated light. For this reason, normally the modulated light is separated from the read light using a half mirror. However, as a result, there is a problem in that light usage efficiency drops. The benefit of using a phase modulation type is lost.

DISCLOSURE OF THE INVENTION

It is an objective of the present invention to take the above-described problem into account and provide a spatial light modulation method and a spatial light modulation device that uses a reflection type spatial light modulator and that has high light usage efficiency.

In order to overcome the above-described problem and other problems, the present invention provides a spatial light modulation device, comprising: a light source for outputting read light; and a reflection type spatial light modulator, the reflection type spatial light modulator including a light modulation layer having liquid crystal as light modulation material, a light reflection layer, a light input surface positioned at one side of the light modulating layer opposite from the light reflection surface, and voltage application means for applying an electric voltage to the light modulation layer, the reflection type spatial light modulator receiving the read light at the light input surface, transmitting the read light through the light modulation layer, reflecting the read light off the light reflection layer, and again transmitting the read light through the light modulation layer, thereby performing light modulation in the light modulation layer twice, and then outputting the modulated light from the input surface, wherein the light source and the reflection type spatial light modulator are arranged so that the read light falls incident on the input surface following an input optical axis that extends at a slant with respect to the light reflection layer and so that the read light outputs from the input surface following a reflection optical axis that extends at a slant with respect to the light reflection layer, wherein the read light includes approximately 100% P-polarized light component that has a polarization direction within a normal plane which is defined to include the input optical axis, the reflection optical axis, and a normal line that extends normal to the light reflection layer, and wherein the light modulation layer has liquid crystal molecules which are oriented so that they are arranged, without any spiral structure with respect to the normal line, within a plane approximately parallel with the normal plane and so that they are tilted, in association with application of the electric voltage by the voltage application means, within the plane which is approximately parallel with the normal plane, thereby causing no twist between the liquid crystal molecules and the oscillating plane of the P-polarized light component of the read light.

According to the spatial light modulation device of the present invention with this configuration, the read light falls incident on the input surface of the reflection type spatial light modulator at a slant. Accordingly, it is possible to separate, without using a half mirror, the read light inputted to the reflection type spatial light modulator from the read light reflected from the reflection type spatial light modulator. Accordingly, light usage efficiency can be increased and the freedom of arrangement of the input and output optical systems can be increased.

Additionally, according to the present invention, read light that includes approximately 100% P-polarized light component falls incident on the input surface at a slant. The P-polarized light component of the read light has a polarization direction within the normal plane that includes the normal line of the light reflection layer of the spatial light modulator and the input optical axis of the read light. Also, the liquid crystal in the light modulation layer is oriented so that they tilt, in association with application of voltage, within the plane that is substantially parallel with the normal plane. Accordingly, no twist develops between the P-polarized light component of the read light and the arrangement direction of the liquid crystal molecules. For this reason, only phase modulation is attained, without any rotation of the polarization plane.

Because the same is for the reflected light, the polarization plane of the modulated light that is finally outputted from the reflection type spatial light modulator has the same polarization plane with that of the input light. Accordingly, the modulated light includes approximately 100% P-polarized light component, and is outputted. It is possible to maintain a high diffraction efficiency.

In particular, it is desirable that the read light may include 100% P-polarized light component, and the light modulation layer may have the liquid crystal molecules which are oriented so that they are arranged, without any spiral structure with respect to the normal line, within a plane parallel with the normal plane and so that they are tilted, in association with application of the electric voltage by the voltage application means, within the plane which is parallel with the normal plane, thereby causing no twist between the liquid crystal molecules and the oscillating plane of the read light.

In this case, no twist occurs between the P-polarized read light and the arrangement direction of the liquid crystal molecules. Accordingly, phase-only modulation can be attained without any rotation of the polarization plane. Accordingly, an extremely high diffraction efficiency can be maintained.

It is desirable that the liquid crystal in the light modulation layer be processed in the homeotropic or homogeneous orientation. By processing the liquid crystal in the homeotropic or homogeneous orientation, the liquid crystal molecules are aligned within a predetermined plane with no spiral structure. By aligning this predetermined plane approximately with the normal plane, it is possible to perform phase modulation without any rotation of the polarization plane.

According to another aspect, the present invention provides a spatial light modulation method, comprising the steps of: preparing a reflection type spatial light modulator, the reflection type spatial light modulator including a light modulation layer having liquid crystal as light modulation material, a light reflection layer, a light input surface positioned at one side of the light modulating layer opposite from the light reflection surface, and voltage application means for applying an electric voltage to the light modulation layer, the reflection type spatial light modulator being for receiving read light at the light input surface, transmitting the read light through the light modulation layer, reflecting the read light off the light reflection layer, and again transmitting the read light through the light modulation layer, thereby performing light modulation in the light modulation layer twice, and then outputting the modulated light from the input surface; and inputting the read light to the reflection type spatial light modulator in a manner that the read light falls incident on the input surface following an input optical axis that extends at a slant with respect to the light reflection layer and that the read light outputs from the input surface following a reflection optical axis that extends at a slant with respect to the light reflection layer, wherein the read light includes approximately 100% P-polarized light component that has a polarization direction within a normal plane which is defined to include the input optical axis, the reflection optical axis, and a normal line that extends normal to the light reflection layer, and wherein the light modulation layer has liquid crystal molecules which are oriented so that they are arranged, without any spiral structure with respect to the normal line, within a plane approximately parallel with the normal plane and so that they are tilted, in association with application of the electric voltage by the voltage application means, within the plane which is approximately parallel with the normal plane, thereby causing no twist between the liquid crystal molecules and the oscillating plane of the P-polarized light component of the read light.

In particular, it is desirable the read light may include 100% P-polarized light component, and the light modulation layer may have the liquid crystal molecules which are oriented so that they are arranged, without any spiral structure with respect to the normal line, within a plane parallel with the normal plane and so that they are tilted, in association with application of the electric voltage by the voltage application means, within the plane which is parallel with the normal plane, thereby causing no twist between the liquid crystal molecules and the oscillating plane of the read light.

Also, it is desirable that the liquid crystal in the light modulation layer be processed in the homogeneous or homeotropic orientation.

BEST MODE FOR CARRYING OUT THE INVENTION

Figure 1:
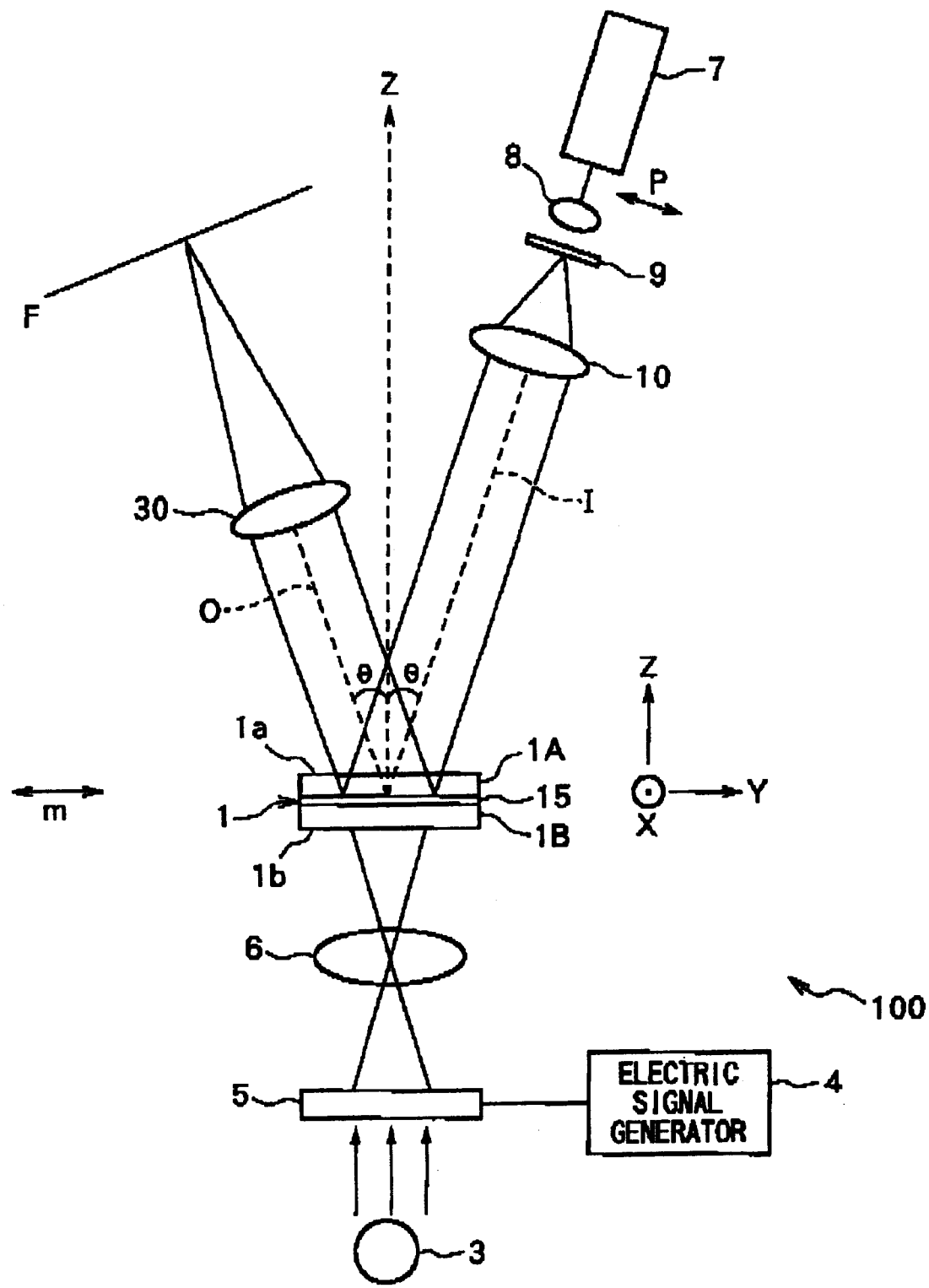
FIG. 1 is a configurational view of a spatial light modulation device according to a first embodiment of the present invention.

Next, preferred embodiments of the present invention will be described while referring to the attached drawings. It should be noted that in order to facilitate understanding of the description, like components in the drawings will be provided with the same reference numbering to the degree possible and redundant explanation omitted.

First, a spatial light modulation device according to a first embodiment of the present invention will be described based on FIGS. 1 to 11.

FIG. 1 is a schematic view showing configuration of a spatial light modulation device according to the present embodiment.

As shown in FIG. 1, a spatial light modulation device, 100 includes a reflection type optically addressed spatial light modulator (referred to as SLM, hereinafter) 1. The SLM 1 includes a light modulation portion 1A, a light address portion 1B, and a mirror layer 15 provided between the light modulation portion 1A and the light address portion 1B. The light address portion 1B has a write light input surface 1b for receiving inputted write light. The light address portion 1B changes optical characteristics of the light modulation portion 1A in accordance with the inputted write light. The light modulation portion 1A includes a read light input surface 1a for receiving inputted read light. The light modulation portion 1A modulates the inputted read light according to the changes in the optical characteristics. The light modulation portion 1A again modulates the read light after the read light reflects off the mirror layer 15, and then outputs the modulated light from the read light input surface 1a.

The SLM 1 is arranged in a three-dimensional XYZ space with the orientation shown in FIG. 1. That is, assuming that the direction perpendicular to the surface of the sheet of FIG. 1 is the X direction and the surface of the sheet is the YZ plane, the SAM 1 is arranged so that the line extending normal to the reflection layer 15 and to the read light input surface 1a extends in the Z axial direction.

A light source 3, a transmission type liquid crystal television 5, and an imaging lens 6 are disposed to the side of the write light input surface 1b of the SLM 1. The light source 3 is for generating the write light. The transmission type liquid crystal television 5 is for displaying write light images. The imaging lens 6 is for imaging the image signals, which are included in the write light, on the write light input surface 1b of the SLM 1. An electric signal generator 4 is connected to the transmission type liquid crystal television S. The electric signal generator 4 is for controlling display of the write light images.

On the other hand, a He—Ne laser 7, a lens 8, a spatial filter 9, and a collimator lens 10 are disposed on the write light input surface 1a side of the SLIM 1: The He—Ne laser 7, the lens 8, the spatial filter 9, and the collimator lens 10 are disposed along an input optical axis I. The input optical axis I is tilted from the line Z, which is normal to the reflection layer 15 and to the input surface 1a, in the Y direction by an angle θ (0°<θ<90°). The He—Ne laser 7 serves as a light source for generating the read light.

Also, a Fourier transform lens 30 is disposed along an output optical axis O. The output optical axis O is tilted in the Y direction by the same angle θ (0°<θ<90°), but to the opposite side of the normal line Z than the input optical axis I. Accordingly, the YZ plane, which includes all of the input optical axis I of the read light, the reflection optical axis O of the read light, and the line Z normal to the input surface 1a and to the reflection layer 15 of the SLM 1, is defined as a "normal plane" for the read light.

The He—Ne laser 7 is for emitting linearly-polarized read light. The He—Ne laser 7 is disposed with an orientation (referred to as a "laser predetermined reference position," hereinafter) so that the Ne—Ne laser 7 emits, as the linearly-polarized read light, a P-polarized light whose electric field oscillation direction is parallel with the normal plane (YZ plane).

Next, the configuration of the SLM 1 will be described in detail with reference to FIG. 2.

The SLM 1 of the present embodiment is a parallel-aligned nematic-liquid-crystal spatial light modulator (PAL-SLM).

The SLM 1 has a glass substrate 12 formed with an AR (anti-reflection) coat layer 11 for preventing unnecessary reflection of incident write light. The AR coat layer 11 defines the write light input surface 1b. An ITO (indium tin oxide) layer 13 and a photoconductive layer 14 are deposited on the surface of the glass substrate 12 opposite the AR coat layer 11. The photoconductive layer 14 is formed from amorphous silicon (a-Si). The resistance of the amorphous silicon changes in accordance with intensity of light incident thereto. The optical address portion 1B is configured from the AR coat layer 11, the glass substrate 12, the ITO 13, and the photoconductive layer 14. A dielectric multi-layer film mirror layer 15 is accumulated on the surface of the photoconductive layer 14 that is opposite from the ITO 13.

The SLM 1 further has a glass substrate 21. An AR coat layer 22 for preventing unnecessary reflection of incident read light is formed on a surface of the glass substrate 21. The AR coat layer 22 defines the read light input surface 1a. An ITO (indium tin oxide) layer 20 is deposited on the surface of the glass substrate 21 that is opposite the AR coat 22.

Alignment layers 16 and 19 are formed on the mirror layer 15 and the ITO 20, respectively. The alignment layers 16, 19 are disposed facing each other, and are connected by a frame-shaped spacer 18. The inside of the frame of the spacer is filled with nematic liquid crystal, which forms a liquid crystal layer 17 that serves as a light modulation layer. The ITOs 13 and 20 are connected to a drive device 2, which applies predetermined voltages between ITOs 13 and 20. The light modulation portion 1A is configured from the AR coat layer 22, the glass substrate 21, the ITO 20, the alignment layer 19, the liquid crystal layer 17, and the alignment layer 16.

Figure 2:
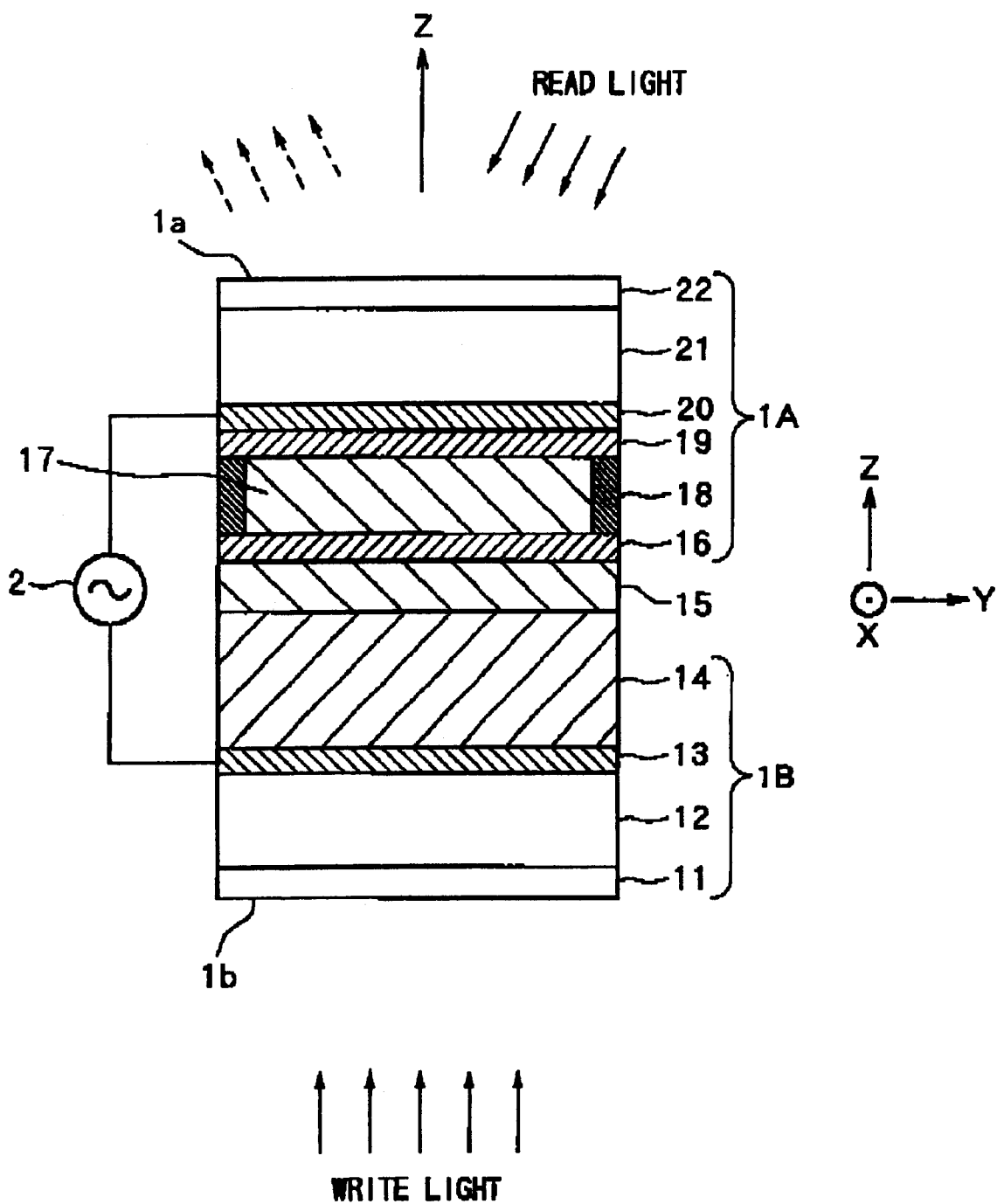
FIG. 2 is a view showing configuration of a reflection type spatial light modulator used in the spatial light modulation device of FIG. 1.

As shown in FIG. 2, the SLM 1 with the above-described configuration is arranged so that the thickness-direction of the light modulation layer 17 is parallel with the Z axial direction and so that the mirror layer 15 and the alignment layers 16, 19 extend parallel with the XY plane.

Next will be described, while referring to FIGS. 3A to 3D, how the nematic liquid crystal is oriented in the light modulation layer 17. It should be noted that to improve clarity, FIGS. 3A to 3D show only the AR coat layer 22, the alignment layer 19, the liquid crystal layer 17, the alignment layer 16, and the reflection layer 15 of the SLM 1 in FIG. 2, and not the remaining layers 21, 20, and 14 to 11.

Figure 3A:
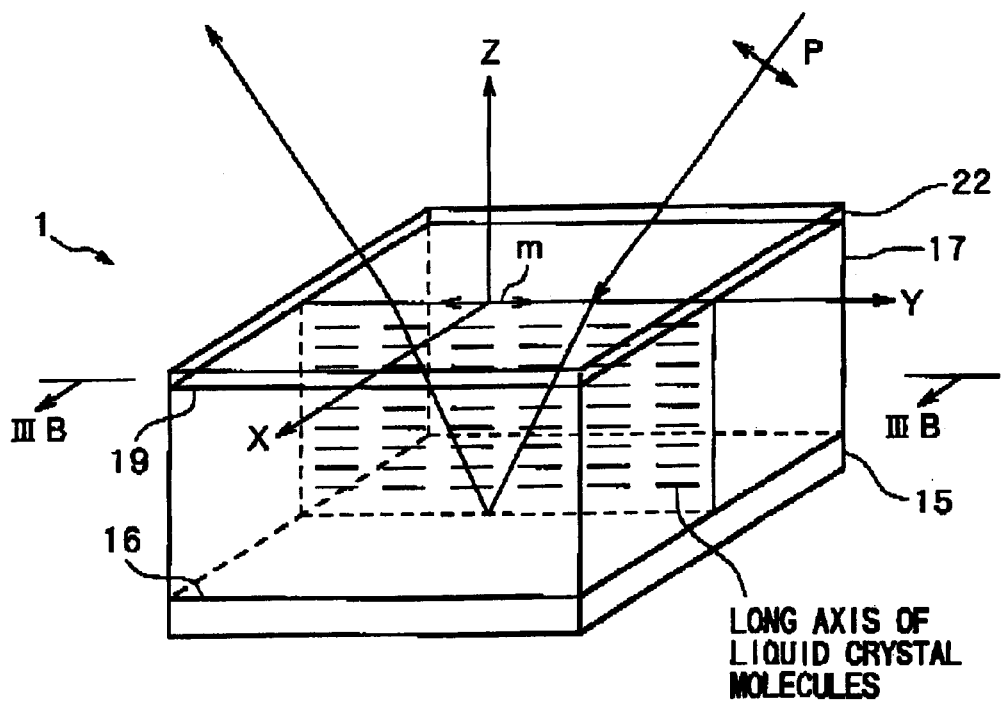
FIG. 3A is an explanatory perspective view for explaining arrangement of liquid crystal in a light modulation layer of the spatial light modulator of FIG. 2.
Figure 3B:
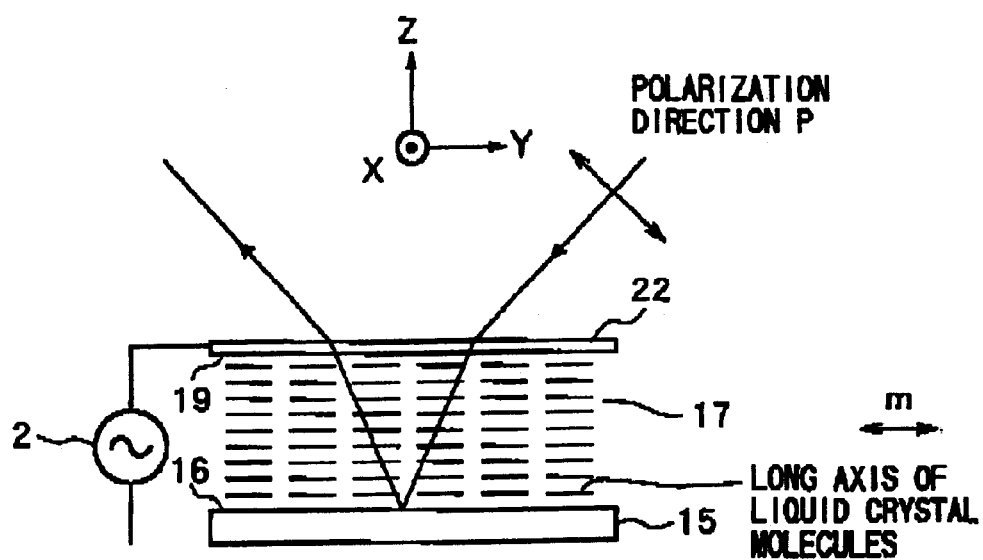
FIG. 3B is a cross-sectional view taken along line IIIB—IIIB of FIG. 3A.

As shown in FIGS. 3A and 3B, in the light modulation layer 17, the nematic liquid crystal molecules are oriented by the alignment layers 16 and 19 to align in a horizontal or homogeneous posture in parallel with the surfaces of the alignment layers 16 and 19 and to face in a single predetermined direction "m". Described in more detail, the long axes of the liquid crystal molecules are aligned parallel to the surfaces of the alignment layers 16, 19, and face in the predetermined direction "m". The long axes of the liquid crystal molecules are arranged with no spiral structure with respect to the thickness direction (Z direction) of the liquid crystal layer 17. The predetermined direction "m" is determined by the direction, in which the alignment layers 16 and 19 are processed in rubbing or oblique deposition processes during the production process of the SLM 1. According to the present embodiment, the SLM 1 is located in the spatial light modulation device 100 with the predetermined direction "m" facing parallel with the Y axial direction (referred to as an SLM predetermined reference position, hereinafter).

Figure 3C:
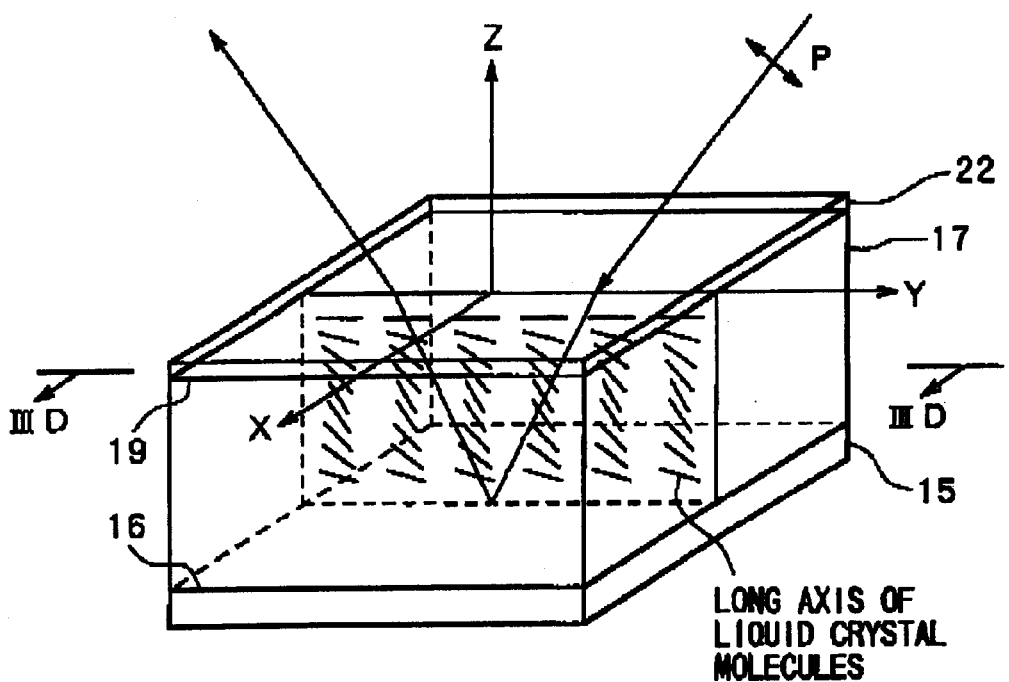
FIG. 3C is an explanatory perspective view for explaining change in alignment of liquid crystals in the light modulation layer of FIG. 3A in accordance with application of voltage.
Figure 3D:
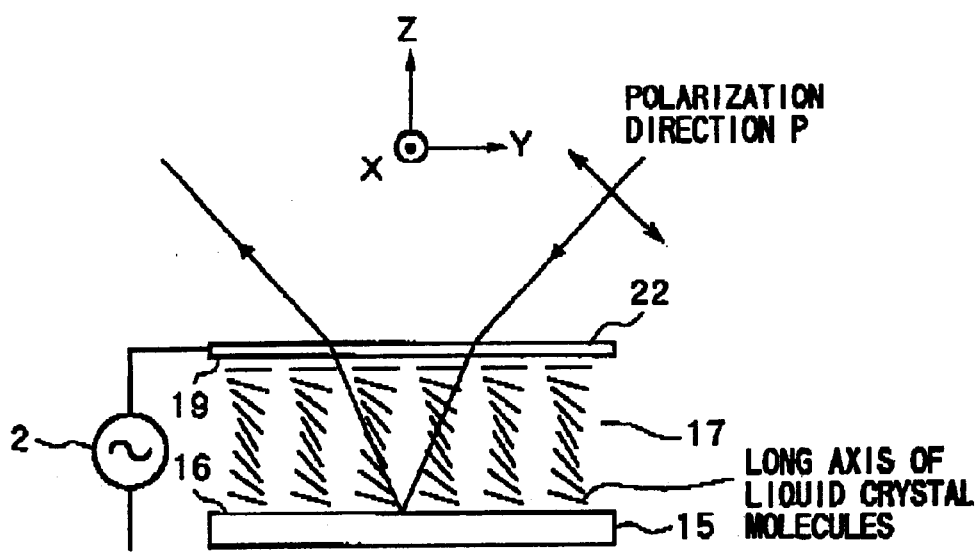
FIG. 3D is a cross-sectional view taken along line IIID—IIID of FIG. 3C.

In this case, when a voltage is applied to the light modulation layer 17 via the ITOs 13 and 20, then as shown in FIGS. 3C and 3D the liquid crystal molecules are tilted or inclined to angles within a plane that is parallel to the YZ plane that includes both the predetermined direction "m" and the thickness direction Z of the liquid crystal layer 17. It should be noted that a pretilt configuration can be used, wherein the liquid crystal molecules are originally tilted slightly within the plane parallel to the YZ plane, even when no voltage is applied.

The liquid crystal in the light modulation layer 17 with this parallel- or homogeneous- aligned configuration has birefringence. For this reason, the SLM 1 controls birefringence by tilting the liquid crystal molecules in accordance with voltage applied thereto, and performs ECB (electrically-controlled birefringence) type modulation. When the linearly-polarized light that falls incident on the light modulation Layer 17 oscillates in a direction which is twisted from the long axis of the liquid crystal molecules, the oscillation plane will cross the long axis of the liquid crystal molecules. As a result, phase difference is generated, based on the difference in refractive indices, between polarized light components that are parallel to the long axis of the liquid crystal molecules and other polarized light components that are perpendicular to the long axis of the liquid crystal molecules. Accordingly, the plane of polarization of the linearly-polarized light rotates. On the other hand, there will be no rotation in the plane of polarization when the linearly-polarized light that falls incident on the light modulation layer 17 oscillates in a direction with no twist with respect to the long axis of the liquid crystal molecules. In this case, the linearly polarized light receives phase modulation based on changes in the refractive index in the oscillation plane. Accordingly, the linearly polarized light receives phase-only modulation.

In the present embodiment, the liquid crystal molecules are oriented to tilt within the plane parallel with the YZ plane, which is the normal plane for the read light. Also, the light source 7 for the read light is disposed with an orientation that emits P-polarized read light to the SLM 1. Because the oscillation plane of the P-polarized read light is parallel with the YZ plane, no twist exists between the long axis of the liquid crystal and the oscillation plane of the read light that falls incident on the liquid crystal layer. For this reason, the read light does not cross the long axis of the liquid crystal molecules, and therefore the plane of polarization of the read light does not rotate Accordingly, high diffraction efficiency, can be achieved by maintaining the polarization direction of the output light as the P-polarized light.

Next, operation of the spatial light modulation device 100 according to the embodiment having the above-described configuration will be described.

When the write light emitted from the light source 3 for write light is transmitted through the liquid crystal television screen 5, predetermined image information controlled by the electric signal generator 4 is written in the write light. The imaging lens 6 images the write light with this image information on the photoconductive layer 14 of the SLM 1. The drive device 2 applies an alternating current (AC) voltage of several volts between the ITOs 13, 20 of the SLM 1. Electrical impedance at the photoconductive layer 14 is changed by pixel positions in the write light image. As a result, the light modulation layer 17 is applied with a partial voltage whose amount changes individually for each pixel. For this reason, the tilt of liquid crystal molecules also changes according to the respective pixels. As shown in FIGS. 3C and 3D, the liquid crystal molecules change their orientation directions within the plane that is parallel with the YZ plane, that is, the normal plane for the read light. As a result, refractive index, with respect to the polarized light component that oscillates within the normal plane (YZ plane), of the light modulation layer 17, will change according to the respective pixels.

Linearly-polarized light emitted from the He—Ne laser 7 is adjusted into parallel light by the lens 8, the spatial filter 9, and the collimator lens 10, and then input to the light modulation layer 17 of the SLM 1 as P-polarized light. Because this read light oscillates within a plane parallel with the normal plane, that is, with the YZ plane, the read light propagates while being phase-modulated by the changing refractive index in the light modulation layer 17. This read light is reflected from the mirror layer 15. The read light again propagates through the light modulation layer 17, and is phase-modulated therein. The read light then outputs from the light input surface 1a. At this time, the phase modulation occurs with good efficiency because no plane of polarization rotation occurs. The output read light is then Fourier transformed by the Fourier transform lens 30A into a predetermined Fourier transform image, for example, a hologram image and the like. The Fourier transform image is formed on the Fourier transform plane F.

In this way, according to the spatial light modulation device 100 of the present embodiment, the P-polarized light falls incident on the reflection type spatial light modulator 1 as read light. The liquid crystal molecules are oriented in a parallel or homogeneous alignment so that they are tilted, in accordance with voltage applied thereto by the drive circuit 2, within a plane in parallel with the normal plane (YZ plane), that is, with a plane that includes the optical axes of both of the modulated light (output light) and the read light (input light). For this reason, during light modulation, no rotation occurs in the plane of polarization of the linearly-polarized light. Accordingly, high diffraction efficiency can be obtained. High light usage efficiency can be obtained. Also, because light is input to and reflected from the SLM 1 at an angle, the input optical axis I is separated from the output axis O. The optical system for input and output can be more freely arranged and the efficiency of light usage can be increased even further.

For comparison purposes, it is conceivable to modify the orientation of the SLM I to an orientation (referred to as a "SLM predetermined comparative position" hereinafter), shown in FIGS. 4, 5A, and 5B, by rotating the SLM 1 from the SLM predetermined reference position around the Z axis by 90 degrees on the XY plane. In this case, the predetermined direction "m", which is the alignment direction of the long axes of the liquid crystal molecules, becomes parallel with the X axial direction. Accordingly, the long axes of the liquid crystal molecules are oriented parallel with the XZ plane. When a voltage is applied to the light modulation layer 17 in this situation, the long axes of the liquid crystal molecules are tilted or inclined within a plane that is parallel with the XZ plane as shown in FIGS. 5C and 5D. Here, the XZ plane is perpendicular with the YZ plane, which is the normal plane for the read light.

Figure 4:
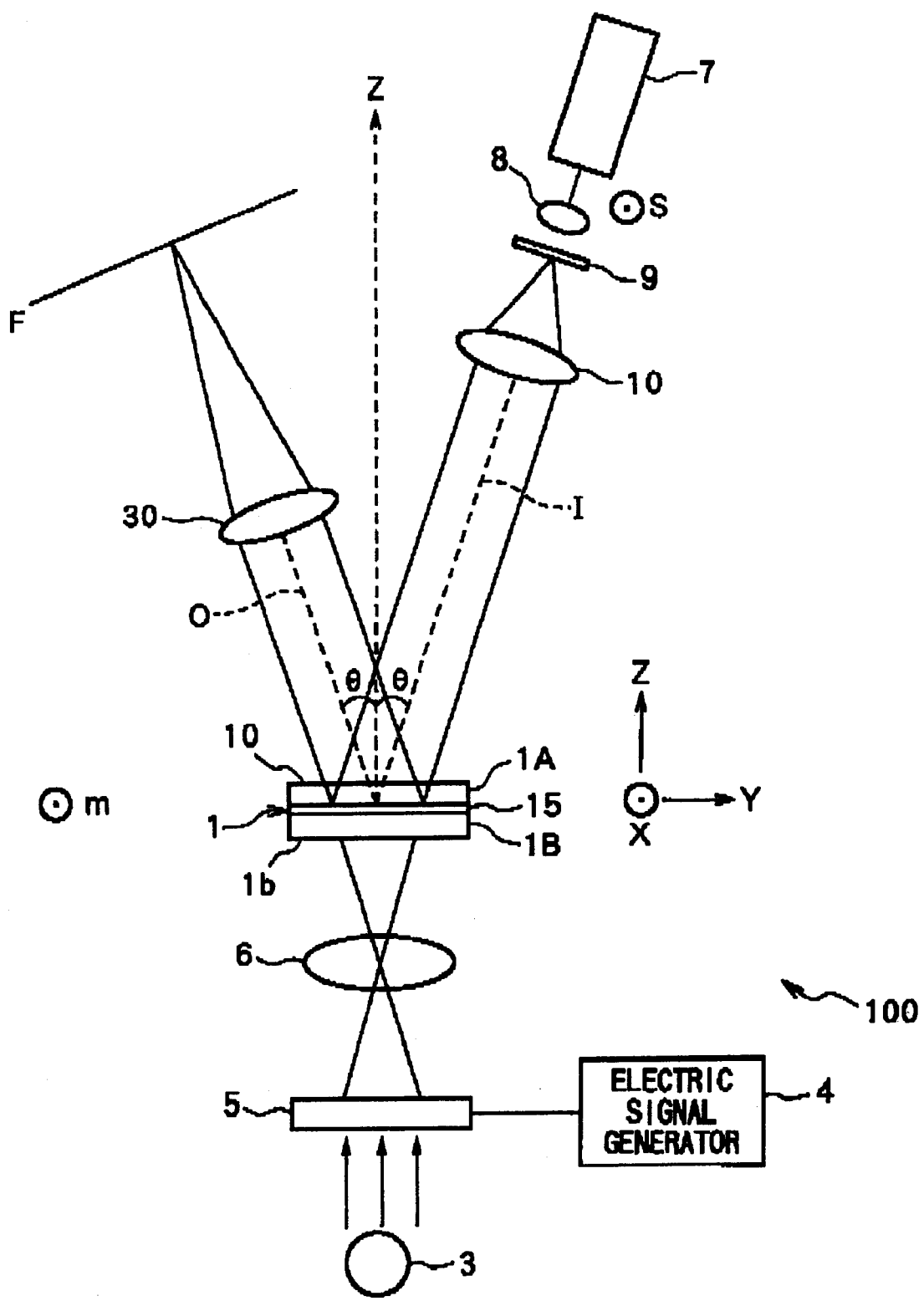
FIG. 4 is a configurational view showing arrangement of a comparative example of a spatial light modulation device.
Figure 5A:
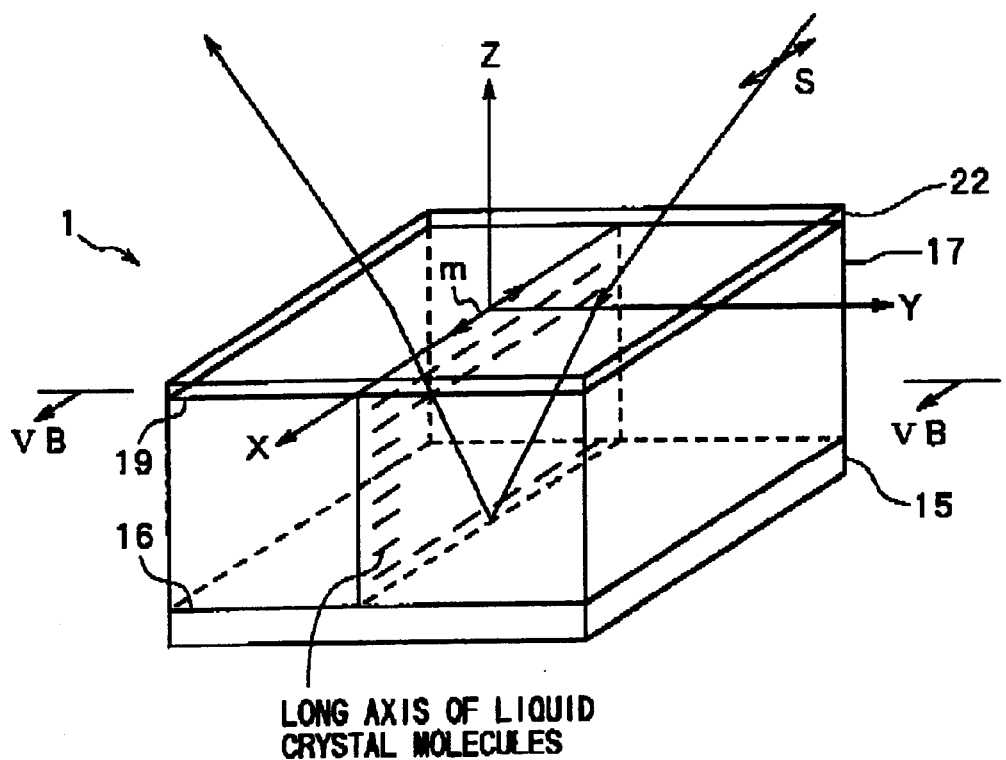
FIG. 5A is an explanatory perspective view for explaining alignment of liquid crystals in the light modulation layer of the spatial light modulator of the comparative example of FIG. 4.
Figure 5B:
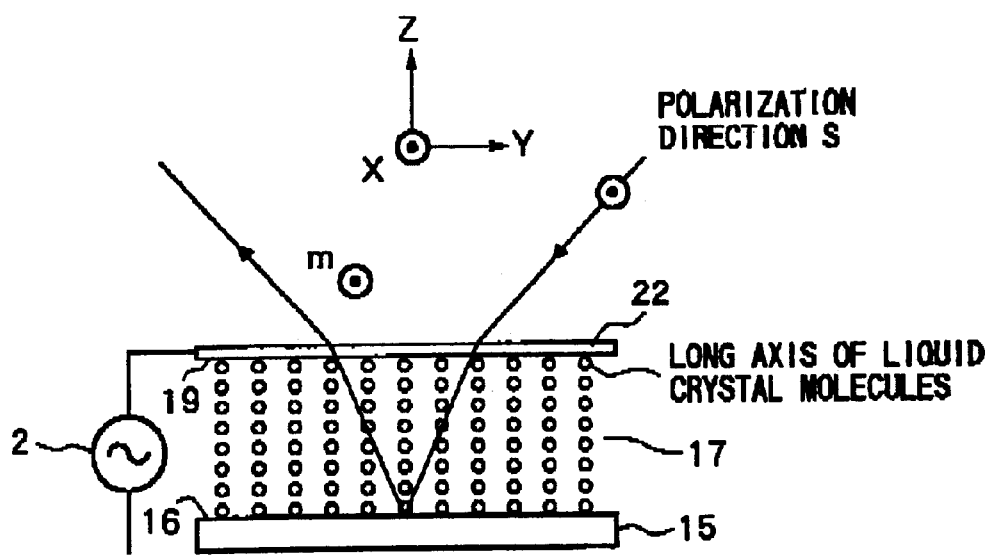
FIG. 5B is a cross-sectional view taken along line VB—VB of FIG. 5A.
Figure 5C:
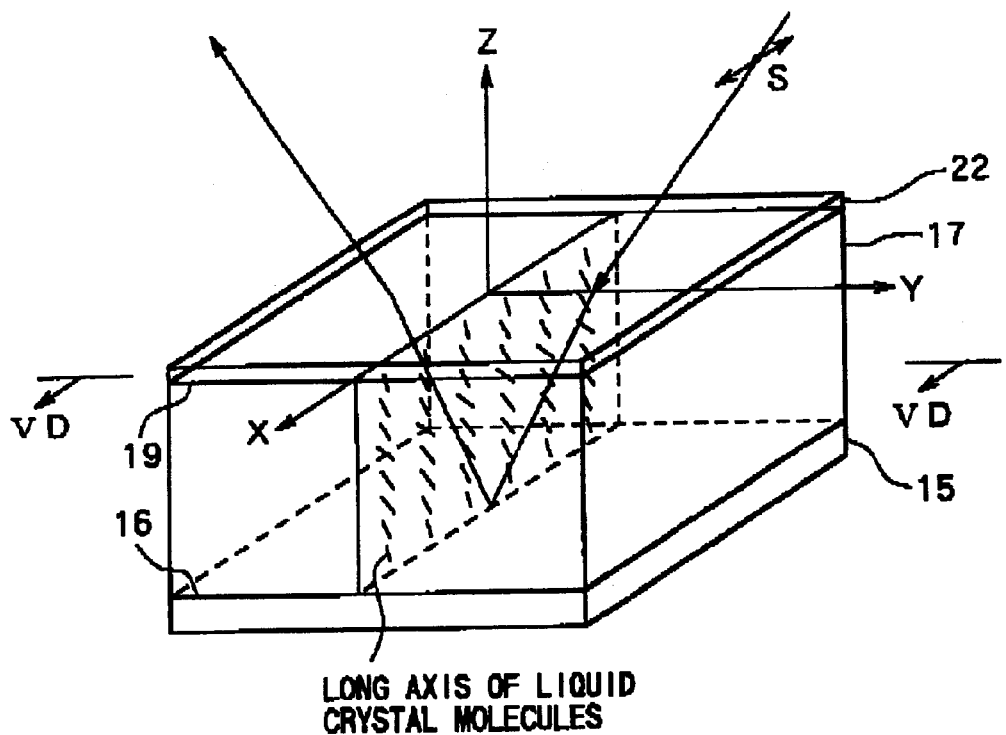
FIG. 5C is an explanatory perspective view for explaining change in alignment of liquid crystals in the light modulation layer of FIG. 5A in association with application of voltage.
Figure 5D:
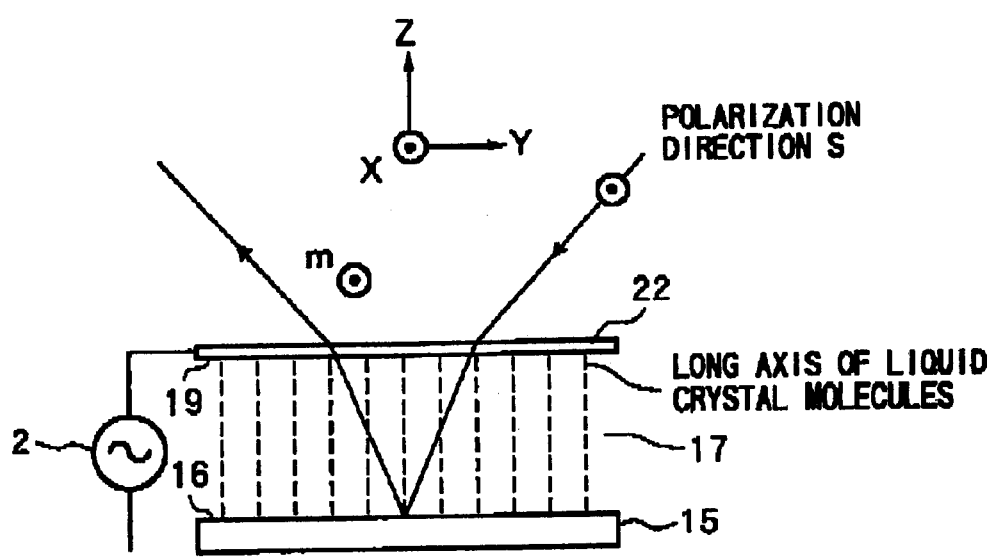
FIG. 5D is a cross-sectional view taken along line VD–5D of FIG. 5C.

Further, as shown in FIG. 4, the light source of the read light 7 is rotated around the input optical axis I by 90 degrees from the laser predetermined reference position to an orientation (which will be referred to as a "laser predetermined comparative position" hereinafter) so that the oscillation direction (polarization direction) of the electric field in the read light will become perpendicular with the normal plane (YZ plane). In this case, the-read light falls incident on the light modulation layer 17 as S-polarized light. When no voltage is applied, then as shown in FIGS. 5A and 5B, the polarization direction of the read light is parallel with the long axis direction of the liquid crystal molecules. However, when a voltage is applied to the light modulation layer 17, then as shown in FIGS. 5C and 5D, the liquid crystal molecules are tilted at an angle within a plane parallel with the XZ plane. As a result, twist develops between the oscillation plane of the read light and the long axes of the liquid crystal molecules, so that the oscillation plane of the read light cuts across the liquid crystal molecules. For this reason, the plane of polarization of the read light rotates so that a high diffraction rate cannot be achieved.

The present inventors performed experiments to confirm the light usage efficiency of the spatial light modulation device 100 according to the present embodiment. The results are indicated below.

FIRST EXPERIMENT

First, a comparative experiment was performed as a first experiment in order to confirm improvement in light usage efficiency of the spatial light modulation device 100 of the present embodiment In this experiment, a vertical stripe image was displayed on the liquid crystal television 5 in the spatial light modulation device 100 with the configuration shown in FIG. 1. Change was measured in the diffraction efficiency (intensity ratio of a first order diffraction light of the read light emitted from the SLM 1) that occurred when the number of displayed stripes (spatial frequency) was changed and when the angle of incidence θ of the read light was changed. During the experiment, in accordance with the configuration of the present embodiment, the SLM 1 was arranged in the SLM predetermined reference position, that is, in the orientation shown in FIGS. 3A to 3D, so that the liquid crystal molecules were tilted within a plane parallel with the normal plane (YZ plane) for the read light. The laser light source 7 was disposed in the laser predetermined reference position, that is, the orientation shown in FIGS. 1 and 3A to 3D, so that the oscillation plane of the read light was parallel with the normal plane, that is, with the YZ plane. Accordingly, the read light fell incident on the SLM 1 as P-polarized light.

Also, as a comparative example, the SLM 1 was disposed in the SLM predetermined comparative position, that is, in the orientation shown in FIGS. 5A to 5D, so that liquid crystal molecules were tilted within the plane parallel with a plane (XZ plane) perpendicular to the normal plane (YZ plane) for the read light. The laser light source 7 was disposed in the laser predetermined comparative position, that is, in the orientation shown in FIGS. 4, and 5A to 5D, so that the oscillation plane of the read light was oriented perpendicular to the normal plane, that is, the YZ plane. Accordingly, the read light fell incident on the SLM 1 as S-polarized light.

Figure 6:
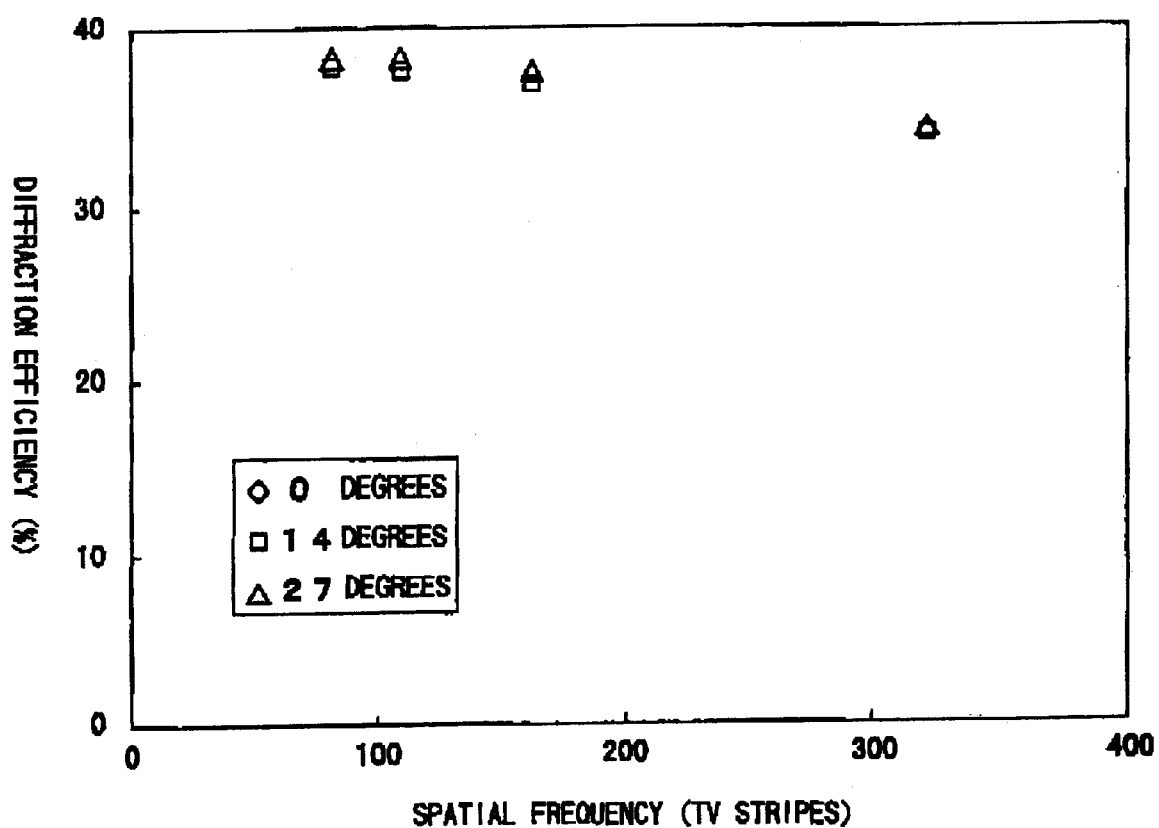
FIG. 6 is a graph showing results obtained in a first experiment that measured diffraction efficiency of the arrangement of the first embodiment.
Figure 7:
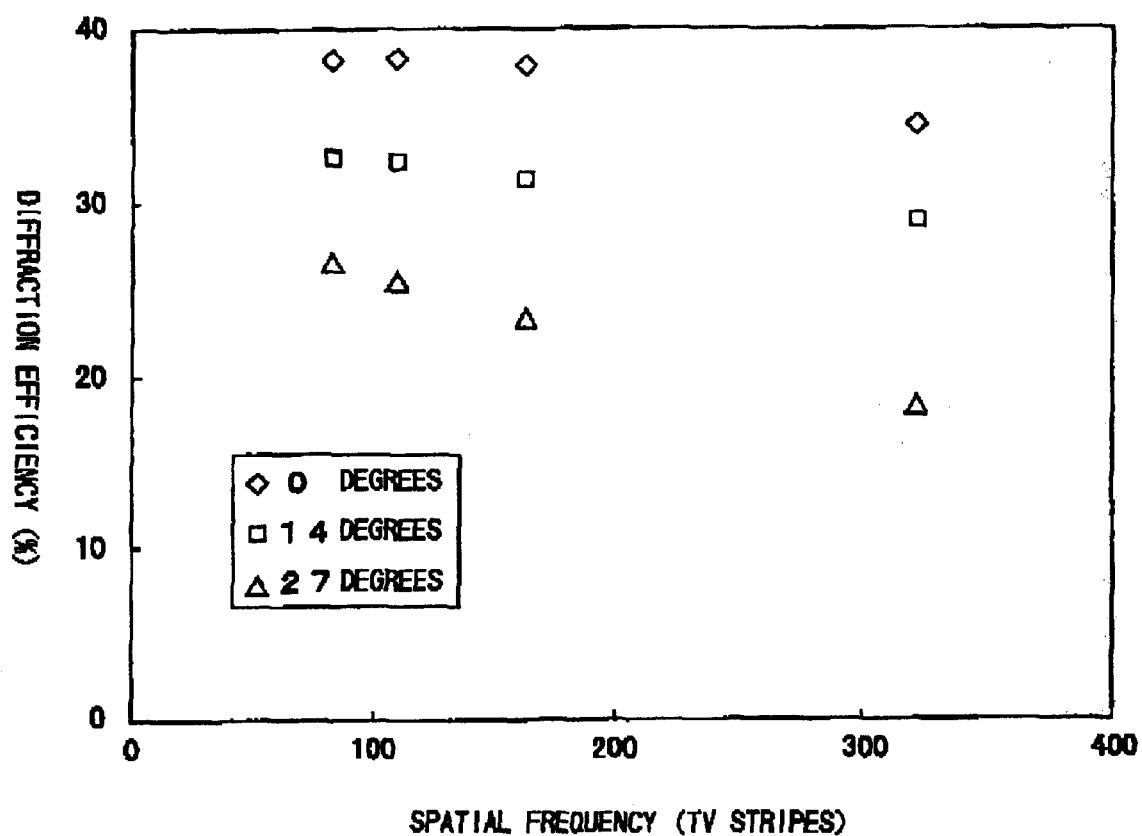
FIG. 7 is a graph showing results obtained in the first experiment that measured diffraction efficiency of the arrangement of the comparative example.

FIG. 6 shows experiment results of the diffraction efficiency obtained using the arrangement of the present embodiment. FIG. 7 shows experiment results of diffraction efficiency obtained using the arrangement of the comparative example.

It was confirmed that using the arrangement of the comparative example, the diffraction efficiency drops with increase in the size of the incident angle θ. In contrast, according to the arrangement of the present embodiment, the diffraction efficiency is maintained high for all the different incident angles θ. It can be understood that according to the present embodiment, the incident angle θ can be increased while maintaining a high diffraction efficiency, that is, a high efficiency of light usage. It is confirmed that by using the arrangement of the present embodiment, even when the read light falls incident on the input surface at an angle, no rotation occurs in the plane of polarization of the modulation light, and therefore high diffraction efficiency, that is, high efficiency of light usage, can be obtained in the same degree as when the read light is inputted normal to the input surface.

According to the present embodiment, because the incident angle θ can be increased while maintaining a high diffraction efficiency, that is, a high efficiency of light usage, the input light path I and the output light path O of the read light can be completely separated from each other without use of additional optical members, such as a half mirror. Therefore, the present embodiment has the additional merit of increasing the freedom of design for the input optical path I and the output optical path O while obtaining a high light usage efficiency.

SECOND EXPERIMENT

Further, the present inventors performed a second experiment.

In this experiment, the positions of the SLM 1 and the laser light source 7 were maintained in the conditions of the present embodiment of FIG. 1, and the normal plane for the read light was maintained fixed on the YZ plane. While maintaining these conditions, the orientation of the light source 7 of the read light, that is, the light polarization direction of the read light, was rotated around the input light optical axis I and, at the same time, the orientation of the SLM 1 was rotated around the Z axis, thereby changing the ratios of the S-polarized light component and of the P-polarized light component of the read light that falls incident on the SLM 1. How the diffraction efficiency changed in association with changes in ratio of the polarized light components was measured.

Figure 8:
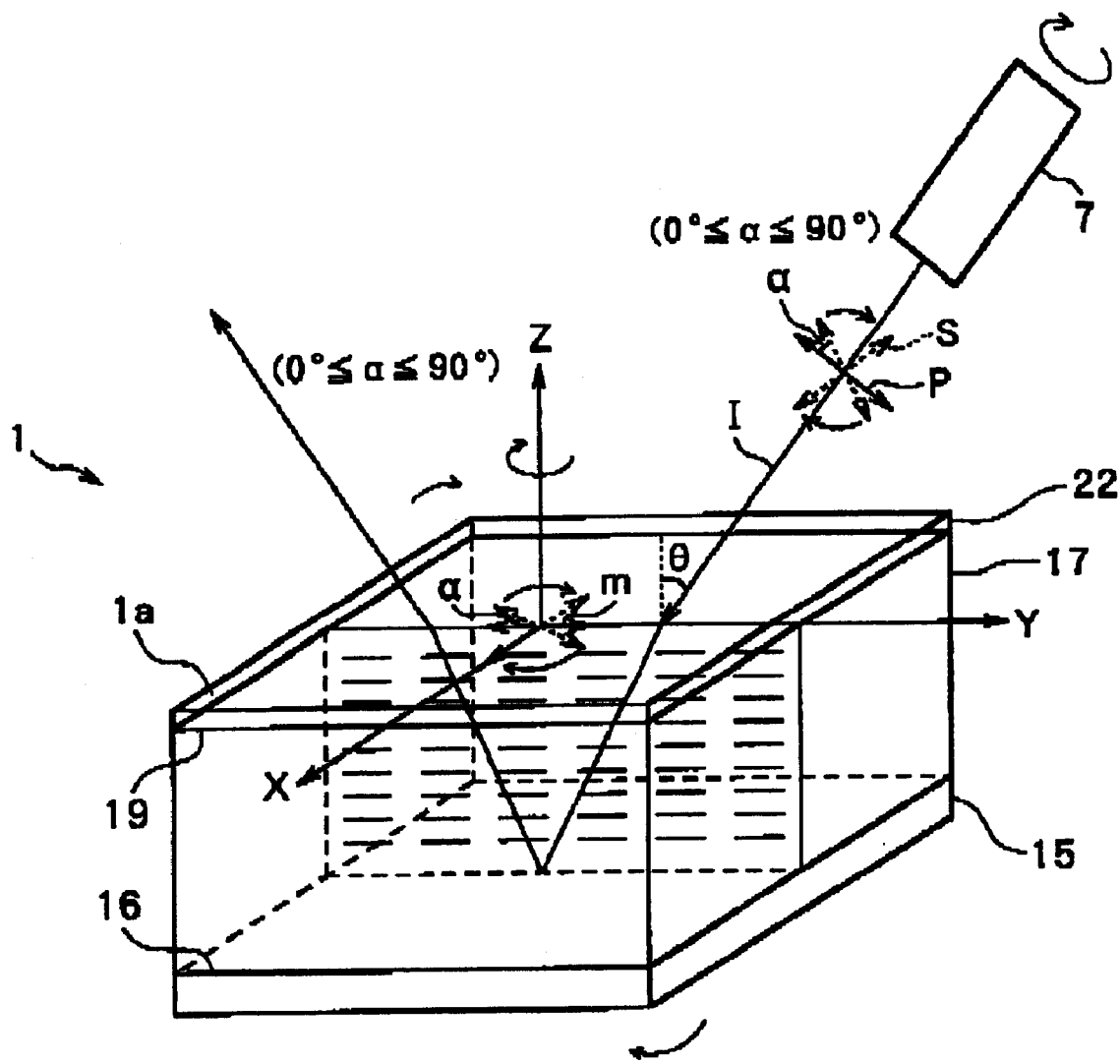
FIG. 8 is an explanatory view for explaining how to change orientation of the spatial light modulator and polarization direction of the read light in a second experiment, in order to change the ratios of P- and S-polarized light components.

Here, the ratio of the P-polarized light component to the S-polarized light component can be made to a desirable ratio of "a:1−a" (where the ratio of the P-polarized light component is "a", and the ratio of the S-polarized light is "1−a", wherein $0 \leq a \leq 1$) by, as shown in FIG. 8, shifting the orientation of the laser light source 7 by an angle α (=arc tan$[(1-a)/a])^{1/2}$) from the laser predetermined reference position, that is, from the orientation wherein the read light oscillation plane is within the YZ plane. At the same time, the orientation of the SLM 1 is also changed by the same angle α from the SLM predetermined reference position, that is, the orientation wherein the liquid crystal arrangement direction "m" extends in the Y axis direction, in order to maintain that no twist exists between the read light oscillation plane and the liquid crystal arrangement direction "m" of the SLM 1.

For example, it can be understood that in order to set the ratio of P-polarized light component to S-polarized light component to 1:0, the SLM 1 and the laser light source 7 should be disposed at the SLM predetermined reference position and the laser predetermined reference position, respectively, because α=0° (=arc tan $[0/1]^{1/2}$) can be determined by knowing that a=1.

Also, in order to set the ratio of the P-polarized light component to S-polarized light component to 0.9:0.1, the SLM 1 and the laser light source 7 should be disposed with an orientation shifted by an angle α of 18.46° from the SLM predetermined reference position and the laser predetermined reference position, respectively, because α=18.4° (=arc tan $[0.1/0.9]^{1/2}$) can be determined by knowing that a=0.9.

Further, in order to set the ratio of P-polarized light component to the S-polarized light component to 0:1, the SLM 1 and the laser light source 7 should be disposed with an orientation shifted by an angle α of 90° from the SLM predetermined reference position and the laser predetermined reference position, respectively, because α=90° (=arc tan $[1/0]^{1/2}$) can be determined by knowing that a=0. In this case, the SLM 1 and the laser light source 7 are disposed at the SLM predetermined comparative position and the laser predetermined comparative position (FIGS. 4 and 5A to 5D), respectively.

The initial arrangement for the experiment was with the laser light source 7 oriented in the laser predetermined reference position, that is, α=0°, as indicated by the solid line in FIG. 8, so that the plane of polarization is parallel with the YZ plane. Also, the SLM 1 was disposed with orientation of the SLM predetermined reference position (α=0°) so that liquid crystals were arranged with direction "m" in parallel with the Y axis direction. In this situation, the ratio "a" of P-polarized light component was 1, so that read light with 100% P-polarized light component fell incident on the SLM 1.

While in this reference position, a binary phase grating was formed on the SLM 1 and the SLM 1 was driven using a drive voltage of 3.0 [V] and at an oscillation of 1 [kHz]. The diffraction efficiency was measured. It should be noted that the incident angle θ of the input optical axis I was set at 15°. Also, the drive voltage was changed to 4.0 [V] and the same measurements were again performed.

Next, in order to set the ratio of P-polarized light to S-polarized light to 0.9:0.1 (that is, a=0.9), the laser light source 7 was rotated clockwise (looking at the laser light source 7 on the input optical axis I from behind the laser light source 7) around the input optical axis I. As a result, as indicated in dotted line in FIG. 8, the light source 7 was oriented with an angular shift from the laser predetermined reference position by a predetermined angle α=18.4°. The SLM 1 was rotated around the Z axis in the clockwise direction (looking at the input surface 1a of the SLM 1 from above along the Z axis) by an angle equivalent to that of the laser light source 7, which placed the SLM 1 in an orientation shifted from the SLM predetermined reference position by the same predetermined angle α=18.4°. As a result, read light with 90% P-polarized light component and the remaining 10% S-polarized light component fell incident on the SLM 1. The diffraction efficiency was again measured in this condition.

The same diffraction efficiency measurements as described above were repeatedly performed while decreasing the ratio "a" of the P-polarized light in the read light by 0.1 increments. That is, measurements were repeatedly performed while gradually increasing the angle α of the SLM 1 from the SLM predetermined reference position, and the angle α of the laser light source 7 from the laser predetermined reference position, in accordance with the P-polarized light ratio value "a".

Once the SLM 1 and the laser light source 7 reached the SLM predetermined comparative position and the laser predetermined comparative position (α=90°), measurements were performed. At this time, the ratio "a" of the P-polarized light component was zero (0), so that read light formed from 100% S-polarized light component fell incident on the SLM 1. Thus, the present experiment was completed for the incident angle θ of the input optical axis I of 15°.

The same experiments as described above were again performed after changing the incident angle θ of the input optical axis I to 30°.

Figure 9:
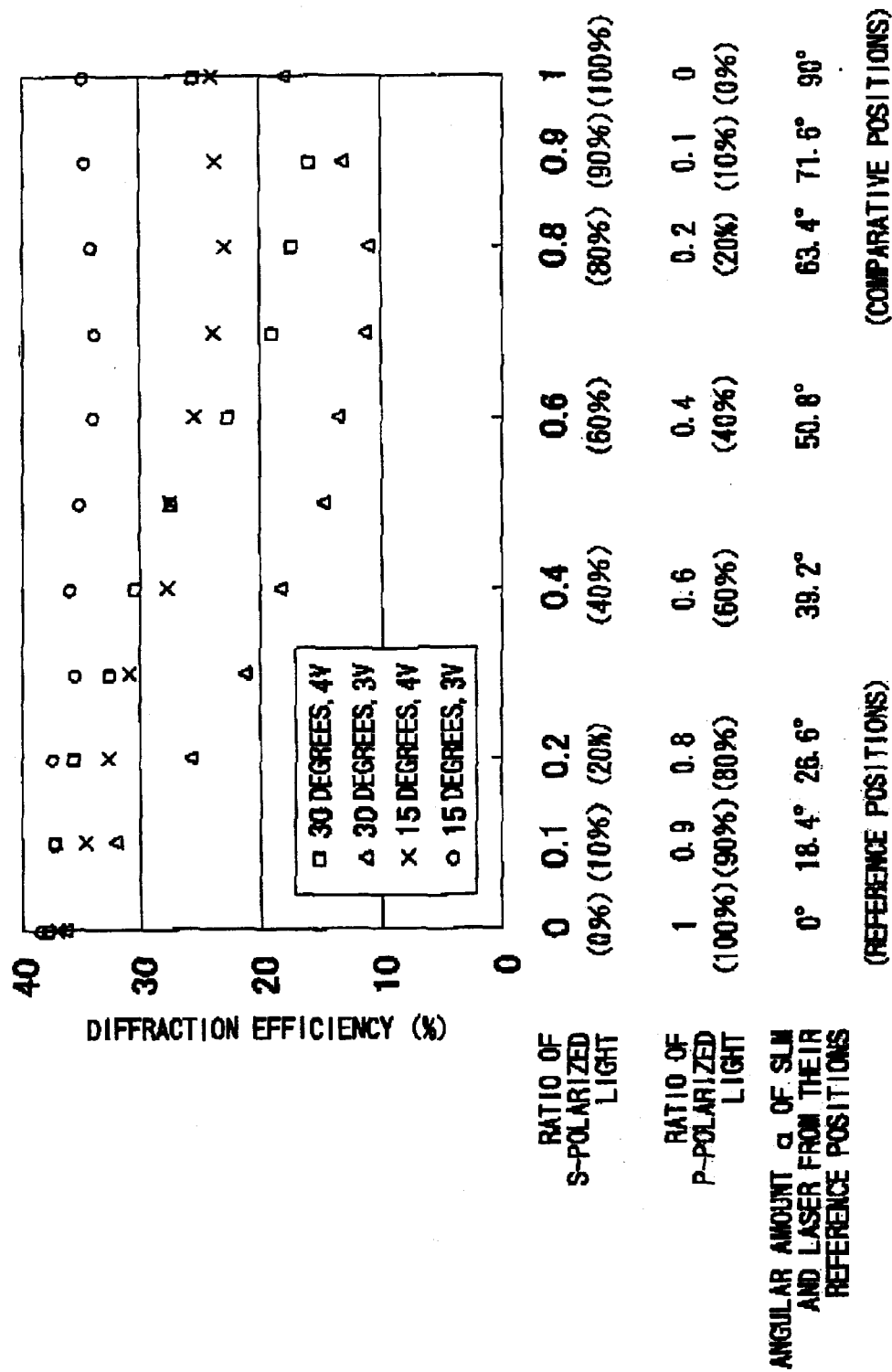
FIG. 9 is a graph showing results of the second experiment that measured diffraction efficiency obtained at different P- and S-polarized light component ratios.

Results of measuring the diffraction efficiency are showing in FIG. 9, wherein the horizontal axis indicates the ratios of P- and S-polarized components and the vertical axis indicates the diffraction efficiency.

As is clear from the measurement results, it was confirmed that an extremely high diffraction efficiency could be obtained at the predetermined reference position (α=0°), wherein the read light is formed from 100% P-polarized light component, independent of the size of the incident angle θ and the drive voltage.

Also, it was confirmed that sufficiently high diffraction efficiency could be obtained when the read light was not 100% P-polarized light but included approximately 100% P-polarized light. For example, it can be understood that sufficiently high diffraction efficiency can be obtained regardless of the size of the incident angle θ and the drive voltage, if the ratio of P-polarized light is greater than or equal to 0.9 and smaller than or equal to 1, that is, when the P-polarized light component is greater than or equal to 90% and smaller than or equal to 100%, and the S-polarized light is greater than or equal to 0% and smaller than or equal to 10%. In concrete terms, it can be understood that sufficiently high diffraction efficiency can be obtained even if the orientation of the laser light: source 7 shifts from the predetermined reference position by an angle greater than or equal to 0° and smaller than or equal to 18.4°, and the orientation of the SLM 1 shifts from the predetermined reference position by an angle greater than or equal to 0° and smaller than or equal to 18.4°.

Said differently, the polarization direction of the read light need not be completely (100%) parallel with the normal plane (YZ plane) for the read light. The polarization plane of the read light need only be within a plane that is approximately 100% parallel with the normal plane (YZ plane) for the read light, for example, within a plane that is shifted, by an angle greater than or equal to 0° and smaller than or equal to 18.4°, from the normal plane (YZ plane) for the read light. Also, the SLM 1 need not be arranged so that the liquid crystal molecules will tilt or incline within a plane that is completely (100%) within the normal plane (YZ plane) for the read light. The liquid crystal molecules need only be arranged to tilt within a plane that is approximately 100% parallel with the normal plane (YZ plane) for the read light, for example, within a plane that is shifted, by an angle greater than or equal to 0° and smaller than or equal to 18.4°, from the normal plane (YZ plane) for the read light.

The spatial light modulation device 100 of the present embodiment having the above characteristics can be used, for example, in image displays, optical analog calculators, and the like, and also in laser processing devices and the like. A laser processing device is for converging light on a work piece, such as a metal plate, to cut or laser-mark the work piece.

When the spatial light modulation device 100 of the present embodiment is used in a laser processing device, a YAG laser, for example, can be used as the light source 7 of the read light instead of a Re—Ne laser. The work piece can be processed by converging laser light into a desired pattern (Fourier pattern) on a work piece that is positioned on the Fourier transform plane F. Described in more detail, an image such as a hologram is formed on the SLM 1 using the liquid crystal television 5. As per FIGS. 1 and 3A to 3D, read light of P-polarized light falls incident at a slant on the SLM 1. The P-polarized read light receives phase modulation that corresponds to the inputted pattern, and is Fourier transformed by the Fourier transform lens 30. By this, the read light converges in the desired pattern on the work piece so that the work piece is processed.

There is very little loss of read light, because the read light falls incident on the SLM 1 at a slant and therefore no half mirror is used for separating the input optical axis from the reflection optical axis. Furthermore, the read light can be converged into the desired pattern with high diffraction efficiency, because only the phase of the read light is modulated. For this reason, the read light from the light source 7 of the read light can be efficiently used in processing.

It should be noted that the read light can have approximately 100% P-polarized light component, and need not be 100% P-polarized light component. Also, the SLM 1 may be oriented so that the plane, within which the liquid crystal molecules of the SLM 1 tilt in association with application of voltage, be approximately parallel with, and need not be completely parallel with, the normal plane (YZ plane) for the read light.

Normally, heat from components in the laser source causes deformation, so that the wave front of the light emitted from the laser 7 becomes distorted and does not become a completely parallel beam. In this case, the converged spot becomes larger so that the precision of processing drops. Because broadening of the converged spot is associated with decrease in power density, it is also associated with inability to efficiently process.

Figure 10:
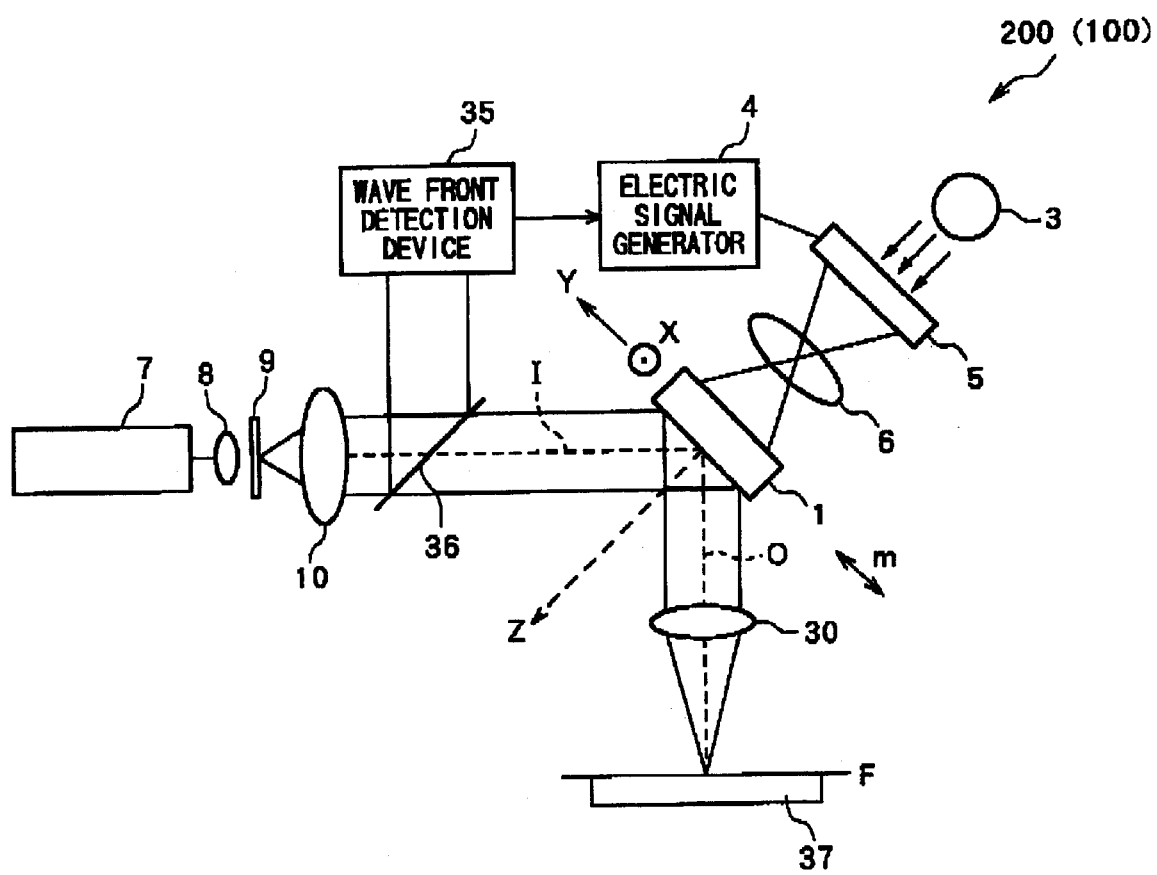
FIG. 10 is a configurational view showing a laser processing device using the spatial light modulation device of the first embodiment.

FIG. 10 shows a laser processor 200, which is a modification of the spatial light modulation device 100 of the embodiment. In order to form a complete parallel light, the laser processor 200 can correct the wave front of laser light that has been distorted for the above-described reasons.

The configuration of the laser processor 200 is substantially the same as that of the spatial light modulation device 100 of the embodiment shown in FIG. 1, but differs in that a beam splitter 36 is provided on the input optical axis I at a position between the SLM 1 and the collimator lens 10. The beam splitter 36 is for guiding a portion of the read light to the SLM 1 and another portion of the light to a wave front detection device 35. The wave front detection device 35 is configured from an interference system, or a Hartmann sensor that uses a micro lens array. The wave front detection device 35 measures the amount of distortion in the wave front of laser light from the beam splitter 36. The wave front detection device 35 is connected to the electric signal generator 4 and, based on the measurement results, controls the electric signal generator 4 to produce a phase pattern for correcting the wave front of the read light to produce an output light of a desired plane wave. For this reason, the SLM 1 can adjust phase of the read light and can produce output light with a plane wave front. Because the output light subjected to Fourier transform at the Fourier transform lens 30 has a plane wave front, a smaller spot can be formed on the work piece 37, which is positioned on the Fourier transform plane F. Laser processing can be achieved with higher precision. It should be noted that the read light in the laser processing device 200 also can be approximately 100% P-polarized light component and need not have completely 100% P-polarized light component. Also, the orientation of the SLM 1 can be arranged so that the plane within which the liquid crystal molecules tilt in association with application of voltage be approximately parallel with, and need not be completely parallel with, the normal plane (YZ plane) for the read light.

Figure 11:
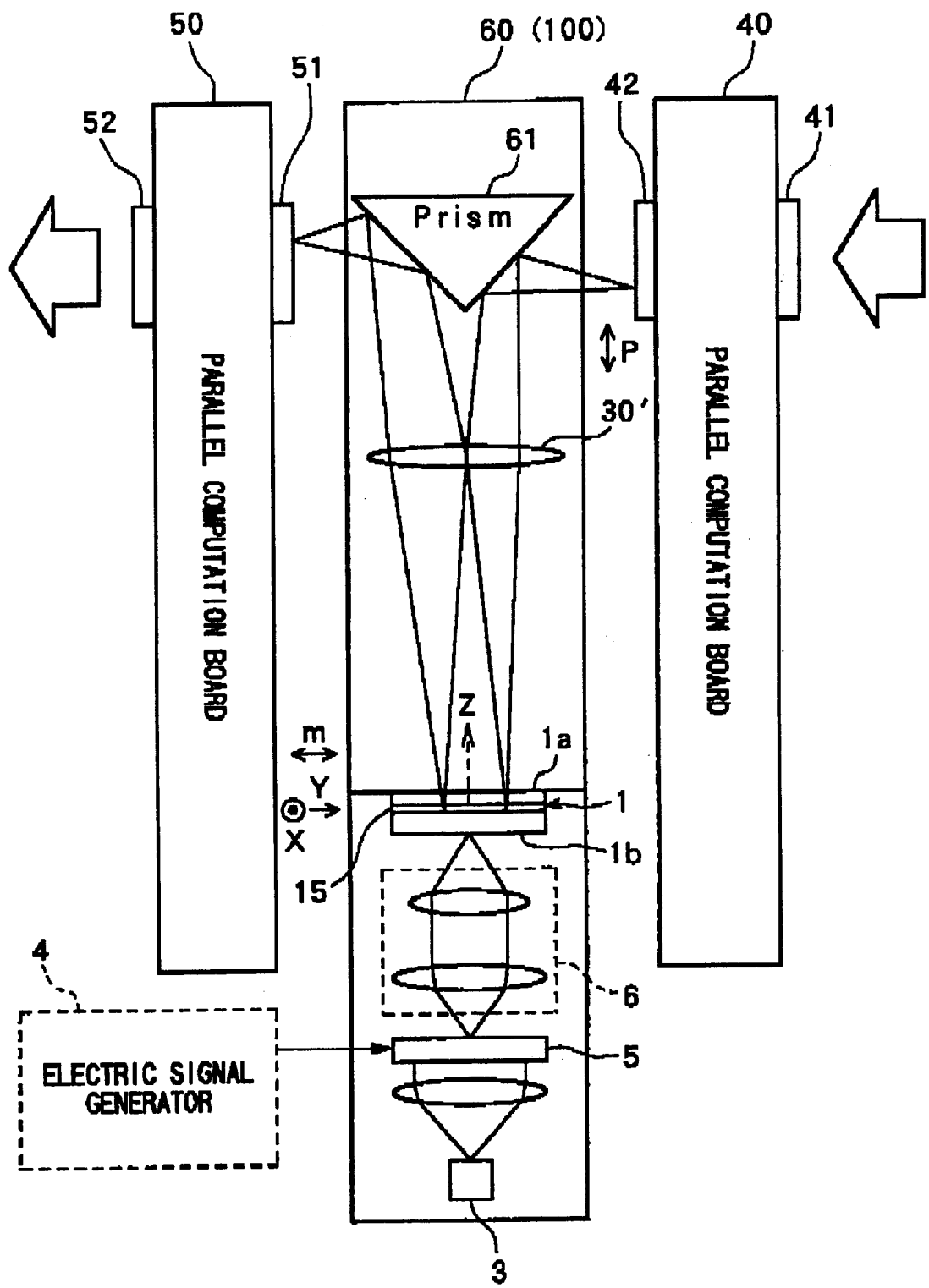
FIG. 11 is a configuration view showing an optical interconnection device configured by applying the spatial light modulation device of the first embodiment.

FIG. 11 is a schematic view showing another example of an application of the spatial light modulation device 100 in the present embodiment.

In this example, the spatial light modulation device 100 is applied to an optical interconnection device 60. The optical interconnection device 60 is for switching connection of elements between parallel computation boards 40 and 50, which exchange information using light.

The parallel computation board 40 includes a light receiving element array 41 for information input and a laser diode array 42 for information output. The parallel computation board 50 includes a light receiving element array 51 for information input and a laser diode array 52 for information output. The optical interconnection device 60 is disposed between the laser diode array 42 of the parallel computation board 40 and the light receiving element array 51 of the parallel computation board 50.

The configuration of the optical interconnection device 60 is substantially the same as the configuration of the spatial light modulation device 100 of the embodiment shown in FIG. 1, but differs in that the read light optical system of the optical interconnection device 60 includes a prism 61 and a Fourier transform lens 30' in place of the laser light source 7, the lens 8, the spatial filter 9, the collimator lens 10, and the Fourier transform lens 30. The prism 61 is for reflecting read light emitted from the laser diode array 42. The Fourier transform lens 30' is for performing a Fourier transform on the read light reflected from the prism 61 and inputting the read light into the read light input surface 1a of the SLM 1. The Fourier transform lens 30' further serves to again perform a Fourier transform operation on the read light that has been output from the read light output surface 1a after modulation by the SLM 1. It should be noted that the prism 61 serves to reflect the read light that has been output from the Fourier transform lens 30' and to guide the light to the light receiving element array 51.

The SLM 1 is disposed at the predetermined reference position (FIGS. 1 to 3D). The line normal to the mirror layer 15 is parallel with the Z axis. Moreover, the liquid crystal molecules in the liquid crystal layer (FIG. 2) tilt or incline within a plane that is parallel with the YZ plane. Also, the read light emitted from the laser diode array 42 and reflected from the prism 61 propagates following the YZ plane, falls incident on the read light input surface 1a at a slant (at an angle θ), reflects off the mirror layer 15, again propagates following the YZ plane, and returns to the prism 61. That is, the YZ plane is the normal plane for the read light. Further, the laser diode array 42 emits read light that is linearly polarized. The laser diode array 42 is disposed in an orientation so that it emits P-polarized light whose plane of polarization is parallel with the YZ plane.

It should be noted that the light source 3, the transmission type liquid crystal television 5 for displaying the write image, and the imaging lens 6 are disposed on the write light input surface 1b side of the SLM 1 in the same manner as in the arrangement of FIG. 1. The liquid crystal television 5 is connected to the electrical signal generator 4 which serves as a write image controller.

In the optical interconnection device 60 with this configuration, the control unit 4 controls the liquid crystal television 5 to display a hologram pattern for optical path switching. When the write light emitted from the light source 3 passes through the liquid crystal television 5, the light path switching hologram pattern is written on the write light. The write light written with this hologram pattern is imaged, via the imaging lens 6 on the photoconductive layer 14 (FIG. 2) of the SLM 1.

The output signal from the parallel computation board 40 is output by the laser diode array 42 as two-dimensional or one-dimensional image information. The image is reflected from the prism 61 and guided to the SLM 1 via the Fourier transform lens 30' as the read light. Then, the read light is input into the light modulation layer 17 of the SLM 1. The read light receives a predetermined phase modulation according to the optical path switch hologram pattern imaged on the photoconductive layer 14. The modulated image again passes through the Fourier transform lens 30', reflects off the prism 61, and outputs to the light receiving element array 51 of the parallel computation board 50.

By changing the hologram image displayed on the liquid crystal television 5, the connection can be switched between optional pixels pairs in the laser diode array 42 of the parallel computation board 40 and in the light receiving element array 51 of the parallel computation board 50.

In the optical interconnection device 60 also, P-polarized linearly-polarized light, wherein the plane of polarization is parallel with the normal plane, is used as the read light. Moreover, the orientation of the SLM 1 is disposed at the predetermined reference position and the plane in which the liquid crystal molecules tilt in association with application of voltage is set to be parallel with the normal plane of the read light. This can obtain high diffraction efficiency. Accordingly, the parallel computation boards 40, 50 can be reliably connected, It should be noted that in the optical interconnection device 60 also, the read light can have approximately 100% P-polarized light component and need not be 100% P-polarized light component. Also, the orientation of the SLM 1 need only bring the plane, in which the liquid crystal molecules tilt in association with application of voltage, into approximately parallel relation with, and not 100% parallel relation with, the read light normal plane (YZ plane).

Next, the spatial light modulation device 100 according to a second embodiment of the present invention will be explained.

The spatial light modulation device 100 of the present embodiment has substantially the same configuration as the spatial light modulation device 100 of the first embodiment shown in FIG. 1, except that it uses an optically addressed type homeotropic arrangement liquid crystal spatial light modulator as the SLM 1 in place of the optically addressed type parallel alignment liquid crystal spatial light modulator. More specifically, the SLM 1 and the light source 7 of the read light are arranged so that the normal plane for the read light matches the YZ plane. Also, the read light source 7 is arranged so that the plane of polarization is parallel with the YZ plane, that is, so that p-polarized read light fall incident on the liquid crystal layer 17.

Figure 12A:
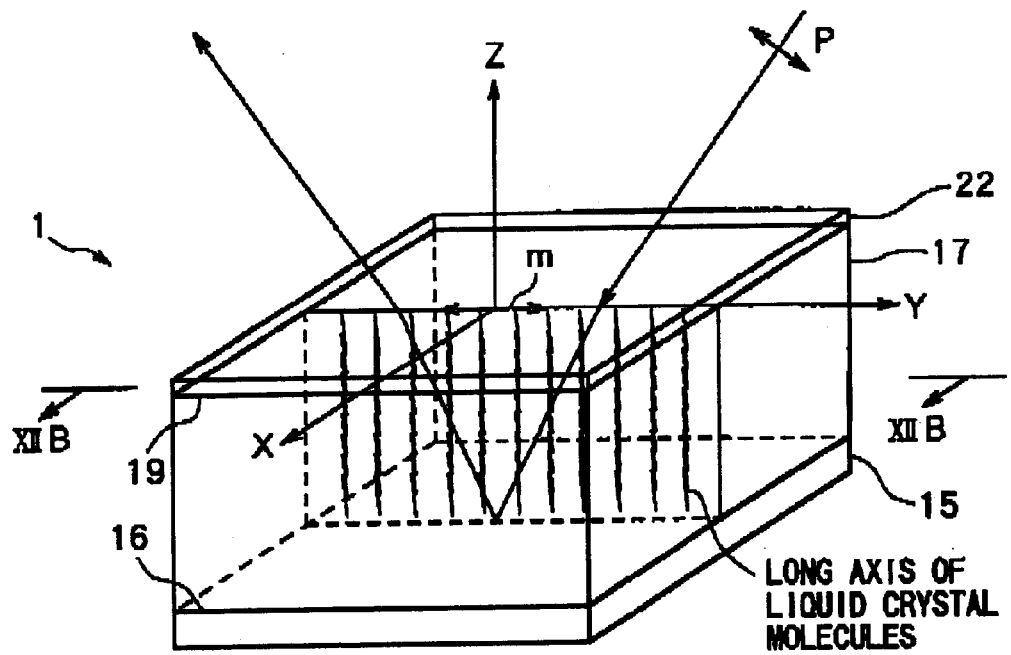
FIG. 12A is an explanatory perspective view for explaining orientation of liquid crystals in the light modulation layer of a reflection type spatial light modulator according to a second embodiment.
Figure 12B:
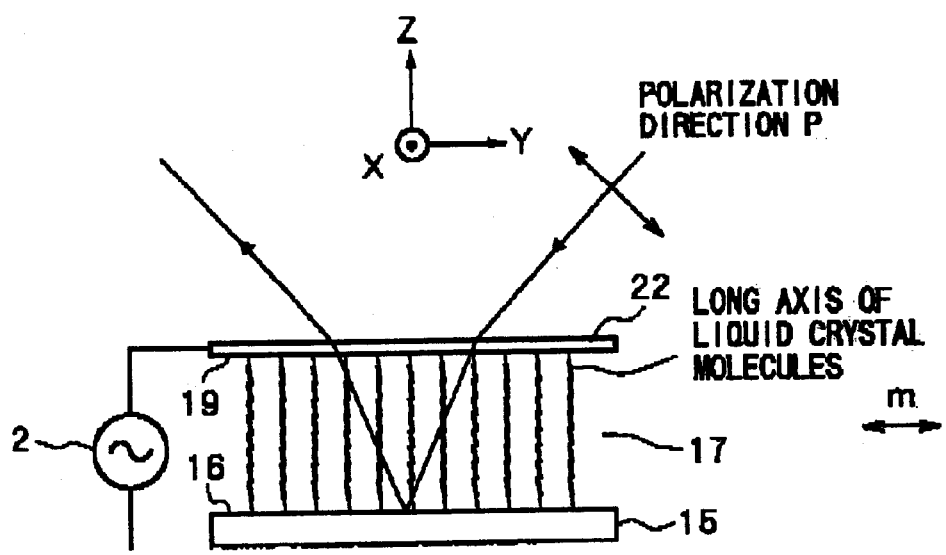
FIG. 12B is a cross-sectional view taken along line XIIB—XIIB of FIG. 12A.
Figure 12C:
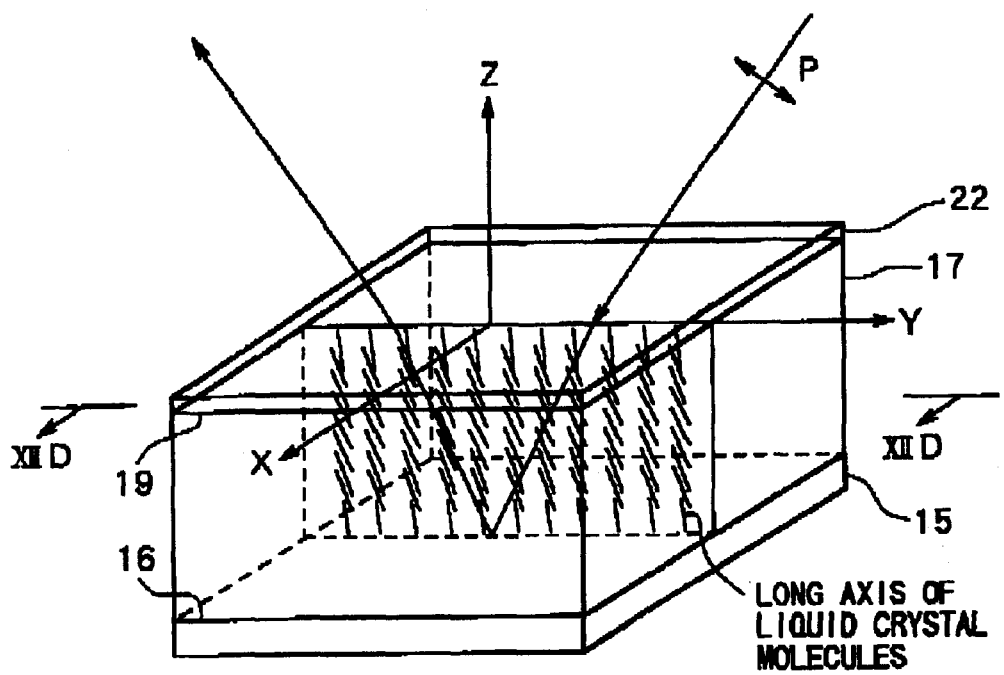
FIG. 12C is an explanatory perspective view for explaining change in alignment of liquid crystal in the light modulation layer of FIG. 12A.
Figure 12D:
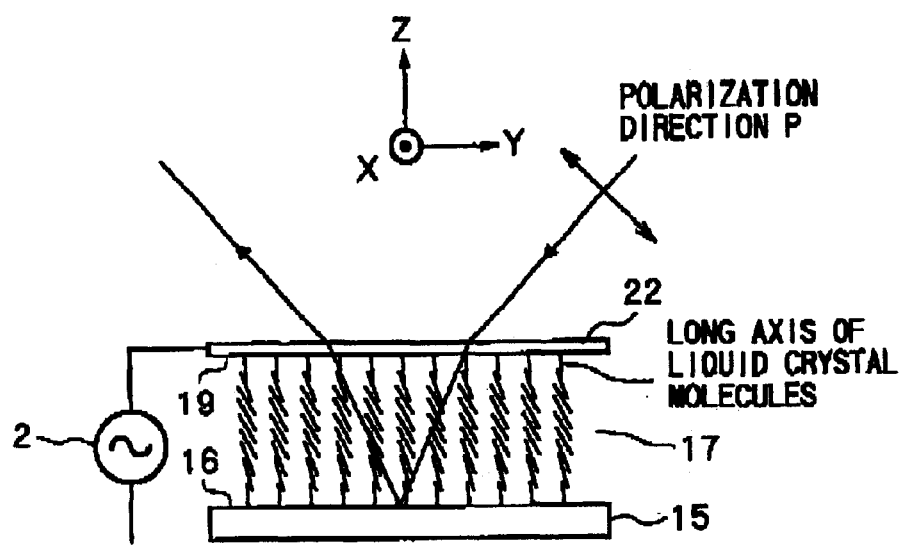
FIG. 12D is a cross-sectional view taken along line XIID—XIID of FIG. 12C.

The homeotropic arrangement liquid crystal spatial light modulator has the same configuration shown in FIG. 2 for the parallel arrangement liquid crystal spatial light modulator. However, the liquid crystal layer 17 is homeotropic arrangement processed by the alignment layers 16, 19 as shown in FIGS. 12A and 12B. That is, the long axis of the liquid crystals is oriented perpendicular with the surface of the alignment layers 16, 19. When a voltage is applied to the liquid crystal layer 17, then as shown in FIGS. 12C and 12D the liquid crystal molecules tilt or incline within a plane that is parallel with a plane including the depth direction (Z axis) of the liquid crystal layer 17 and a single predetermined direction "m". The predetermined direction "m" is determined by the process direction, in which the alignment layers 16, 19 are processed in the rubbing or oblique deposition processes during the production process of the SLM 1. In the case of the present embodiment, when arranging the SLM 1 in the spatial light modulation device 100, the predetermined direction "m" of the SLM 1 is aligned in parallel with the Y axial direction, that is, the SLM 1 is placed at the predetermined reference position. Accordingly, the liquid crystal molecules tilt within a plane that is parallel with the YZ plane. It should be noted that a pretilt configuration can be used, wherein the liquid crystal molecules are originally tilted slightly within the plane parallel with the YZ plane even when no voltage is being applied.

With the configuration of the present embodiment, even if the liquid crystal molecules tilt within the plane that is parallel with the YZ plane, the read light falls incident without crossing the liquid crystal molecules because no twist is developed between the liquid crystal molecules and P-polarized light that oscillates within the plane that is parallel with the YZ plane. Accordingly, phase-only modulation can be reliably achieved without any rotation of the polarization plane of the read light, so high diffraction efficiency can be achieved.

In this way, the spatial light modulation device of the present embodiment uses P-polarized light input at a slant in the read light, and the liquid crystal molecules in the light modulation layer 17 of the SLM 1 are oriented in the homeotropic arrangement so as to tilt, in association with the application of a voltage, within the plane that is parallel with the normal plane (YZ plane) of the read light, Therefore, the polarization plane of the light does not rotate during light modulation. Accordingly, high diffraction efficiency can be obtained and high usage efficiency can be obtained. Also, because the light is reflected off the SLM 1 at a slant, the input optical axis and the output optical axis can be separated from each other. The arrangement of the input and output optical systems have higher freedom of design and usage efficiency of light increases still further.

It should be noted that in the same way as in the first embodiment, the read light need only have approximately 100% P-polarized light component, and need not be completely 100% P-polarized light. Also, the orientation of the SLM 1 need only be so that the plane in which the liquid crystal molecules tilt in association with application of voltage is approximately parallel with, and need not be completely parallel with, the normal plane (YZ plane) of the read light.

The spatial light modulation device 100 of the present embodiment can be used in a laser processing unit, an optical connection device, and the like in the same way as the first embodiment.

The spatial light modulation device of the present invention can be modified in a variety of ways, and is not limited to the above-described embodiments.

For example, a variety of types of laser source can be used as the light source of the read light, in order to output linearly-polarized read light.

Also, the orientation of the liquid crystal is not limited to the homogeneous arrangement shown in FIGS. 3A to 3D nor to the homeotropic arrangement shown in FIGS. 12A to 12D, but could be a hybrid arrangement or a slanted or tilted arrangement. It is sufficient that the liquid crystal molecules be arranged so that when a voltage is applied, they will tilt within the plane that is approximately parallel with the normal plane of the read light.

Further, an optically addressed type spatial light modulator is used in the above embodiment as the SLM 1. However an electrically addressed type spatial light modulator could be used instead. In this case, an electrode array with a plurality of pixel electrodes is provided in place of the ITO 13 and the photoconductive layer 14 in the optical address portion 1B. By selectively applying image signals to the individual electrodes, the voltage applied to the liquid crystal layer 17 can be controlled separately for each pixel.

Further, a variety of different types of transmission type electrically addressed type spatial light modulators can be used instead of the transmission type liquid crystal television 5.

INDUSTRIAL APPLICABILITY

The spatial light modulation device according to the present invention can be broadly used in a variety of spatial light modulation devices that use phase modulation. For example, it can be used broadly for laser processing, optical computing, computer generated holograms, and the like.

What is claimed is:

1. A spatial light modulation device, comprising:
    a light source for outputting read light; and
    a reflection type spatial light modulator, the reflection type spatial light modulator including a light modulation layer having liquid crystal as light modulation material, a light reflection layer, a light input surface positioned at one side of the light modulating layer opposite from the light reflection layer, and voltage application means for applying an electric voltage to the light modulation layer, the reflection type spatial light modulator receiving the read light at the light input surface, transmitting the read light through the light modulation layer, reflecting the read light off the light reflection layer, and again transmitting the read light through the light modulation layer, thereby performing light modulation in the light modulation layer twice, and then outputting the modulated light from the input surface,
    wherein the light source and the reflection type spatial light modulator are arranged so that the read light falls incident on the input surface following an input optical axis that extends at a slant with respect to the light reflection layer and so that the read light outputs from the input surface following a reflection optical axis that extends at a slant with respect to the light reflection layer,
    wherein the read light includes approximately 100% P-polarized light component that has a polarization direction within a normal plane which is defined to include the input optical axis, the reflection optical axis, and a normal line that extends normal to the light reflection layer, and
    wherein the light modulation layer has liquid crystal molecules which are oriented so that they are arranged, without any spiral structure with respect to the normal line, within a plane approximately parallel with the normal plane and so that they are tilted, in association with application of the electric voltage by the voltage application means, within the plane which is approximately parallel with the normal plane, thereby causing no twist between the liquid crystal molecules and an oscillating plane of the P-polarized light component of the read light.

2. A spatial light modulation device as claimed in claim 1, wherein the read light includes 100% P-polarized light component, and the light modulation layer has the liquid crystal molecules which are oriented so that they are arranged, without any spiral structure with respect to the normal line, within a plane parallel with the normal plane and so that they are tilted, in association with application of the electric voltage by the voltage application means, within the plane which is parallel with the normal plane, thereby causing no twist between the liquid crystal molecules and the oscillating plane of the read light.

3. A spatial light modulation device as claimed in claim 1, wherein the liquid crystal molecules in the light modulation layer are processed into a homogeneous orientation.

4. A spatial light modulation device as claimed in claim 1, wherein the liquid crystal molecules in the light modulation layer are processed into a homeotropic orientation.

5. A spatial light modulation device as claimed in claim 1, further comprising a Fourier transform lens for spatially Fourier transforming the modulated light which is outputted from the reflection type spatial light modulator.

6. A spatial light modulation device as claimed in claim 1, wherein the voltage applying means includes a photoconductive layer controlling the electric voltage applied to the light modulating layer in accordance with write light incident thereto.

7. A spatial light modulation device as claimed in claim 1, wherein the light modulation layer modulates, in association with application of the electric voltage by the voltage application means, phase of the P-polarized light component of the read light, without rotating the oscillating plane of the P-polarized light component of the read light.

8. A spatial light modulation method, comprising the steps of:
    preparing a reflection type spatial light modulator, the reflection type spatial light modulator including a light modulation layer having liquid crystal as light modulation material, a light reflection layer, a light input surface positioned at one side of the light modulating layer opposite from the light reflection layer, and voltage application means for applying an electric voltage to the light modulation layer, the reflection type spatial light modulator being for receiving read light at the light input surface, transmitting the read light through the light modulation layer, reflecting the read light off the light reflection layer, and again transmitting the read light through the light modulation layer, thereby performing light modulation in the light modulation layer twice, and then outputting the modulated light from the input surface; and
    inputting the read light to the reflection type spatial light modulator in a manner that the read light falls incident on the input surface following an input optical axis that extends at a slant with respect to the light reflection layer and that the read light outputs from the input surface following a reflection optical axis that extends at a slant with respect to the light reflection layer,
    wherein the read light includes approximately 100% P-polarized light component that has a polarization direction within a normal plane which is defined to include the input optical axis, the reflection optical axis, and a normal line that extends normal to the light reflection layer, and
    wherein the light modulation layer has liquid crystal molecules which are oriented so that they are arranged, without any spiral structure with respect to the normal line, within a plane approximately parallel with the normal plane and so that they are tilted, in association with application of the electric voltage by the voltage application means, within the plane which is approximately parallel with the normal plane, thereby causing no twist between the liquid crystal molecules and an oscillating plane of the P-polarized light component of the read light.

9. A spatial light modulation method as claimed in claim 8, wherein the read light includes 100% P-polarized light component, and the light modulation layer has the liquid crystal molecules which are oriented so that they are arranged, without any spiral structure with respect to the normal line, within a plane parallel with the normal plane and so that they are tilted, in association with application of the electric voltage by the voltage application means, within the plane which is parallel with the normal plane, thereby causing no twist between the liquid crystal molecules and the oscillating plane of the read light.

10. A spatial light modulation method as claimed in claim 8, wherein the liquid crystal molecules in the light modulation layer are processed into a homogeneous orientation.

11. A spatial light modulation method as claimed in claim 8, wherein the liquid crystal molecules in the light modulation layer are processed into a homeotropic orientation.

12. A spatial light modulation method as claimed in claim 8, further comprising a method of using a Fourier transform lens to spatially Fourier transform the modulated light which is outputted from the reflection type spatial light modulator.

13. A spatial light modulation method as claimed in claim 8, wherein the voltage applying means includes a photoconductive layer controlling the electric voltage applied to the light modulating layer in accordance with write light incident thereto.

14. A spatial light modulation method as claimed in claim 8, wherein the light modulation layer modulates, in association with application of the electric voltage by the voltage application means, phase of the P-polarized light component of the read light, without rotating the oscillating plane of the P-polarized light component of the read light.

* * * * *